United States Patent
Farahani et al.

(10) Patent No.: US 12,282,753 B1
(45) Date of Patent: Apr. 22, 2025

(54) EXTERNAL-LANGUAGE EXECUTION NODE FOR VISUAL FORECASTING

(71) Applicant: SAS Institute Inc., Cary, NC (US)

(72) Inventors: Iman Vasheghani Farahani, Charlotte, NC (US); Mahesh V. Joshi, Cary, NC (US); Phillip M. Helmkamp, Apex, NC (US); Rajib Nath, Pune (IN); Vilochan Suresh Muley, Pune (IN); Javier Delgado, Cary, NC (US); Michele Angelo Trovero, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/762,480

(22) Filed: Jul. 2, 2024

Related U.S. Application Data

(60) Provisional application No. 63/600,450, filed on Nov. 17, 2023.

(30) Foreign Application Priority Data

Oct. 9, 2023 (IN) .............................. 202311067607

(51) Int. Cl.
| | |
|---|---|
| *G06F 8/34* | (2018.01) |
| *G06F 3/0482* | (2013.01) |
| *G06F 3/0486* | (2013.01) |
| *G06F 8/41* | (2018.01) |
| *G06F 9/54* | (2006.01) |
| *G06F 16/25* | (2019.01) |

(Continued)

(52) U.S. Cl.
CPC .............. *G06F 8/34* (2013.01); *G06F 3/0482* (2013.01); *G06F 3/0486* (2013.01); *G06F 8/41* (2013.01);

(Continued)

(58) Field of Classification Search
CPC ...... G06F 16/38; G06F 16/258; G06F 3/0482; G06F 3/0486; G06F 40/30; G06F 8/447;
(Continued)

(56) References Cited

U.S. PATENT DOCUMENTS 9,424,333 B1 * 8/2016 Bisignani .............. G06F 3/0482
11,221,727 B1 * 1/2022 Alvarez Rodriguez .. G06F 8/41
(Continued)

OTHER PUBLICATIONS

Wang, CN 109977675, (translation), Jul. 5, 2019, 30 pgs <CN_109977675.pdf>.*
(Continued)

*Primary Examiner* — Tuan A Vu
(74) *Attorney, Agent, or Firm* — Kilpatrick Townsend & Stockton LLP

(57) ABSTRACT

In one example, a computer system can generate a graphical user interface (GUI) for forecasting software including a drag-and-drop canvas with a set of rearrangeable nodes defining a forecasting pipeline. The computer system can detect a user interaction for attaching an external-language execution node to the pipeline, which can be used to insert custom code defined using an external programming language. The computer system can receive the custom code. The computer system can receive a user input to initiate execution of the pipeline. The computer system can generate wrapped custom code by augmenting the custom code with additional program code including shared variables. The computer system can provide the wrapped custom code to a set of execution threads configured to execute the wrapped custom code as part of the pipeline to generate one or more forecasts. The computer system can output the forecasts in the GUI.

30 Claims, 25 Drawing Sheets

(51) Int. Cl.
    *G06F 16/38*     (2019.01)
    *G06F 40/30*     (2020.01)
    *H04L 65/1101*   (2022.01)
    *H04L 67/01*     (2022.01)
(52) U.S. Cl.
    CPC .............. *G06F 8/447* (2013.01); *G06F 9/542* (2013.01); *G06F 16/258* (2019.01); *G06F 16/38* (2019.01); *G06F 40/30* (2020.01); *H04L 65/1101* (2022.05); *H04L 67/01* (2022.05)
(58) Field of Classification Search
    CPC ... G06F 9/542; G06F 8/34; G06F 8/41; G05B 19/41865; H04L 67/01; H04L 65/1101
    See application file for complete search history.

(56) References Cited

U.S. PATENT DOCUMENTS

| | | | | |
|---|---|---|---|---|
| 2006/0101098 | A1* | 5/2006 | Morgan | H04L 65/1101 |
| 2016/0092484 | A1* | 3/2016 | Finkler | G06F 16/258 |
| | | | | 707/715 |
| 2017/0038919 | A1* | 2/2017 | Moss | G06F 3/0482 |
| 2017/0102694 | A1* | 4/2017 | Enver | G05B 19/41865 |
| 2018/0293517 | A1* | 10/2018 | Browne | H04L 67/01 |
| 2019/0146849 | A1* | 5/2019 | Leonard | G06F 9/542 |
| | | | | 718/104 |
| 2020/0057634 | A1* | 2/2020 | Makkar | G06F 40/30 |
| 2021/0012223 | A1* | 1/2021 | Wu | G06F 16/38 |

OTHER PUBLICATIONS

Sharma, WO 2018042233, Mar. 8, 2018, 3 pgs <WO_2018042233.pdf>.*

"Forecasting with the Distributed Open Source Code Node" SAS Communities Library, Aug. 17, 2023 https://communities.sas.com/t5/SAS-Communities-Library/Forecasting-with-the-Distributed-Open-Source-Code-node/ta-p/889628.

* cited by examiner

EXTERNAL-LANGUAGE EXECUTION NODE FOR VISUAL FORECASTING

REFERENCE TO RELATED APPLICATIONS

The claims the benefit of priority under 35 U.S.C. 119(b) to Indian Provisional Patent Application No. 202311067607, filed Oct. 9, 2023, and the benefit of priority under 35 U.S.C. § 119(e) to U.S. Provisional Patent Application No. 63/600,450, filed Nov. 17, 2023, the entirety of each of which is hereby incorporated by reference herein.

TECHNICAL FIELD

The present disclosure relates generally to visual forecasting on a computer. More specifically, but not by way of limitation, this disclosure relates to constructing a visual forecasting pipeline including an external-language execution node that can allow a user to input external-language program code to be executed as part of the visual forecasting pipeline.

BACKGROUND

Visual forecasting software can enable users to generate forecasts from historical time series data using automation and sophisticated analytics. Visual forecasting may be provided by analytics platforms that can accommodate large-scale, parallel, and distributed time series modeling and forecasting. Some examples of visual forecasting software may provide graphical user interfaces (GUIs) that allow users to build projects using visual workflows or "pipelines." The pipelines may include features such as model and variable selection, forecasting, time series analysis, and so on.

During visual forecasting, a GUI can be used for selection of time series analysis techniques and generation of forecasts. The visual forecasting GUI may include components for configuring data, developing and operating pipelines, selection of optimal "champion" forecasting models, and generation of reports following pipeline execution. To define a pipeline, a user can interact with the GUI to position a series of visual nodes corresponding to various functions that can execute in a specified order including both serial and parallel operations. The nodes may correspond to various functions for data input, model assessment, model comparison, output, etc. The user can then run the pipeline to execute the corresponding functions in the defined sequence on a time series dataset to generate a forecast.

SUMMARY

One example of the present disclosure includes a system comprising one or more processors and one or more memories including instructions that are executable by the one or more processors for causing the one or more processors to perform operations. The operations can include generating a graphical user interface (GUI) for forecasting software, wherein the GUI includes a drag-and-drop canvas comprising a set of rearrangeable nodes defining a forecasting pipeline for forecasting one or more time series, the forecasting pipeline involving a sequence of operations for processing the one or more time series to produce one or more forecasts, each rearrangeable node in the set of rearrangeable nodes corresponding to a respective operation of the sequence of operations. The operations can include detecting a user interaction with the GUI for attaching an external-language execution node to the set of rearrangeable nodes on the drag-and-drop canvas in relation to the forecasting pipeline, the external-language execution node being usable to insert custom code defined using an external programming language into the forecasting pipeline, wherein the external programming language is different than a first default programming language of the forecasting software, and wherein the custom code is code provided by a user of the GUI from a source external to the forecasting software. The operations can include receiving the custom code written in the external programming language for the external-language execution node. The operations can include receiving a user input for initiating an execution of the forecasting pipeline. In response to receiving the user input, the operations can include generating wrapped custom code by augmenting the custom code with additional program code. The additional program code includes shared variables. The shared variables include one or more input variables corresponding to the external programming language and one or more output variables corresponding to the first default programming language. The one or more input variables include input information to be provided by the forecasting software to the custom code. The one or more output variables include output information to be provided from the custom code to the forecasting software. The operations can include providing the wrapped custom code to a set of execution threads, the set of execution threads being configured to execute the wrapped custom code as part of the forecasting pipeline to generate the one or more forecasts. The operations can include outputting the one or more forecasts in the GUI.

Another example of the present disclosure includes a method comprising operations. The operations can include generating a graphical user interface (GUI) for forecasting software, wherein the GUI includes a drag-and-drop canvas comprising a set of rearrangeable nodes defining a forecasting pipeline for forecasting one or more time series, the forecasting pipeline involving a sequence of operations for processing the one or more time series to produce one or more forecasts, each rearrangeable node in the set of rearrangeable nodes corresponding to a respective operation of the sequence of operations. The operations can include detecting a user interaction with the GUI for attaching an external-language execution node to the set of rearrangeable nodes on the drag-and-drop canvas in relation to the forecasting pipeline, the external-language execution node being usable to insert custom code defined using an external programming language into the forecasting pipeline, wherein the external programming language is different than a first default programming language of the forecasting software, and wherein the custom code is code provided by a user of the GUI from a source external to the forecasting software. The operations can include receiving the custom code written in the external programming language for the external-language execution node. The operations can include receiving a user input for initiating an execution of the forecasting pipeline. In response to receiving the user input, the operations can include generating wrapped custom code by augmenting the custom code with additional program code. The additional program code includes shared variables. The shared variables include one or more input variables corresponding to the external programming language and one or more output variables corresponding to the first default programming language. The one or more input variables include input information to be provided by the forecasting software to the custom code. The one or more output variables include output information to be provided from the custom code to the forecasting software. The operations can include providing the wrapped custom code to a set of execution threads, the set of execution threads being configured to execute the wrapped custom code as part of the forecasting pipeline to generate the one or more forecasts. The operations can include outputting the one or more forecasts in the GUI.

Another example of the present disclosure includes a non-transitory computer-readable medium comprising program code that is executable by one or more processors for causing the one or more processors to perform operations. The operations can include generating a graphical user interface (GUI) for forecasting software, wherein the GUI includes a drag-and-drop canvas comprising a set of rearrangeable nodes defining a forecasting pipeline for forecasting one or more time series, the forecasting pipeline involving a sequence of operations for processing the one or more time series to produce one or more forecasts, each rearrangeable node in the set of rearrangeable nodes corresponding to a respective operation of the sequence of operations. The operations can include detecting a user interaction with the GUI for attaching an external-language execution node to the set of rearrangeable nodes on the drag-and-drop canvas in relation to the forecasting pipeline, the external-language execution node being usable to insert custom code defined using an external programming language into the forecasting pipeline, wherein the external programming language is different than a first default programming language of the forecasting software, and wherein the custom code is code provided by a user of the GUI from a source external to the forecasting software. The operations can include receiving the custom code written in the external programming language for the external-language execution node. The operations can include receiving a user input for initiating an execution of the forecasting pipeline. In response to receiving the user input, the operations can include generating wrapped custom code by augmenting the custom code with additional program code. The additional program code includes shared variables. The shared variables include one or more input variables corresponding to the external programming language and one or more output variables corresponding to the first default programming language. The one or more input variables include input information to be provided by the forecasting software to the custom code. The one or more output variables include output information to be provided from the custom code to the forecasting software. The operations can include providing the wrapped custom code to a set of execution threads, the set of execution threads being configured to execute the wrapped custom code as part of the forecasting pipeline to generate the one or more forecasts. The operations can include outputting the one or more forecasts in the GUI.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
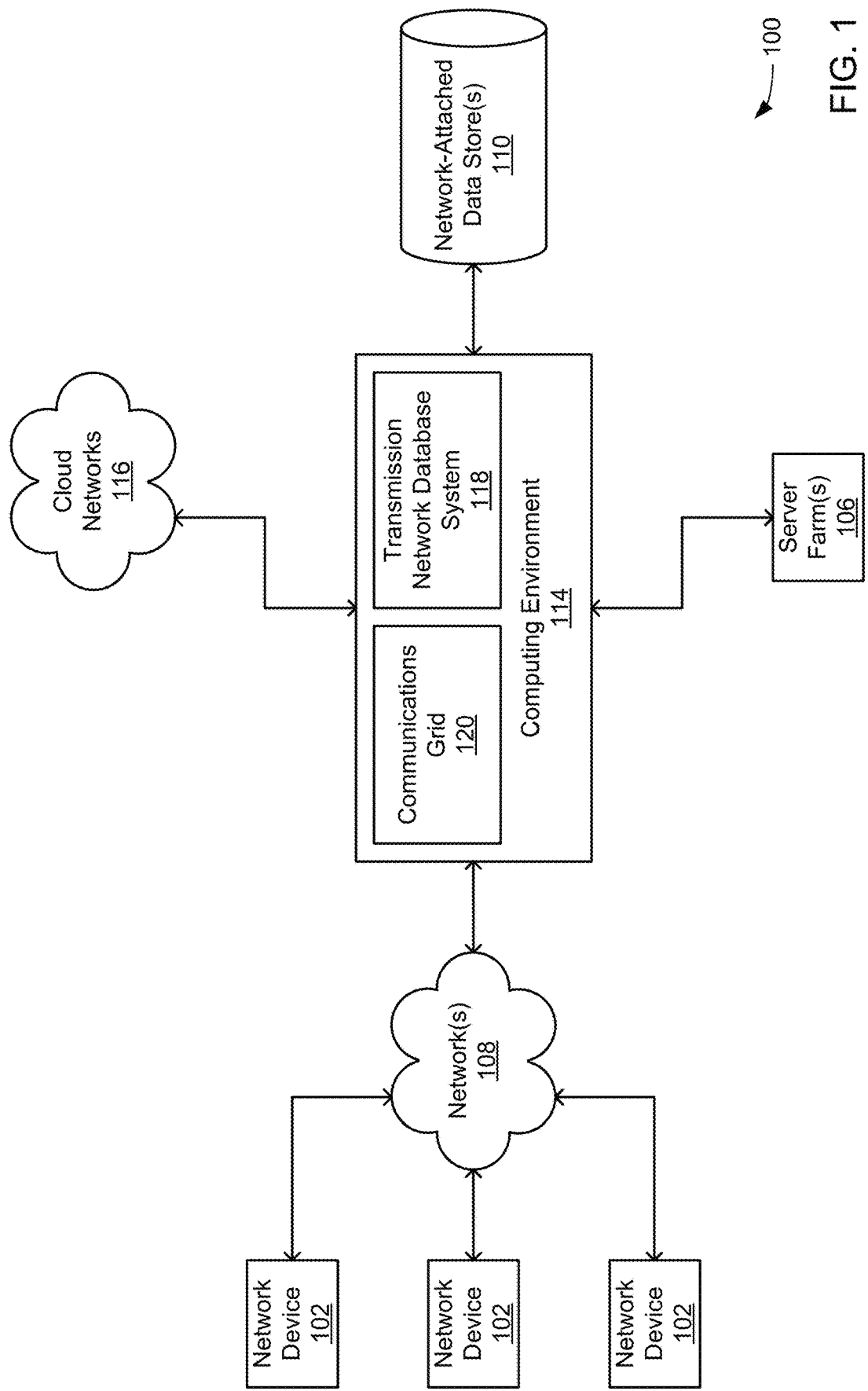
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Visual forecasting software can be used to quickly and automatically generate forecasts based on historical input time series data. Such software includes a graphical user interface (GUI) that may have a drag-and-drop canvas on which a set of rearrangeable nodes can be arranged and connected for designing a forecasting "pipeline." Each node can represent a processing operation or collection of operations. For example, nodes can provide operations relating to data hygiene, forecasting model selection, forecasting, post-processing analyses, and so on.

While visual forecasting software may include pre-built forecasting operations that can be used to generate forecasts, in some cases the visual forecasting software can also be designed to interpret a particular programming language. Users can use the interpreted programming language to, for example, author custom forecasting operations. For instance, users can use the interpreted programming language to define specialized algorithms that fit their particular forecasting needs. The specialized algorithms may involve complex statistical models, machine learning algorithms, or tailored data processing steps. But the interpreted programming language may not be as widely available as some other programming languages. The visual forecasting software may not allow other programming languages to be used because of the complexities involved. For example, the interpreted programming language may present technical integration difficulties due to design limitations, published APIs or SDKs may be incompatible with those of other programming languages, certain custom language features may lack equivalents in other programming languages, and so on. As a result, it is common for visual forecasting software to only allow a single, default, interpreted programming language for use in customizing forecasting operations.

Despite the above, some users may desire to use other programming languages to develop their own custom forecasting operations or for other related purposes. For example, a user may possess an implementation of a particular algorithm in a programming language other than the default programming language interpreted by the visual forecasting software. In this context, the programming language other than the programming language interpreted by the visual forecasting software will be referred to as an external programming language. The external programming language can be, for example, an open-source programming language or a programming language used for the development of open-source software. In some examples, the external programming language may be a closed-source programming language or a programming language used for the development of closed-source software, embedded software, enterprise software, system software, and so on. In many situations, porting the algorithm from the external programming language to the default programming language of the visual forecasting software may be impractical, inefficient, or even impossible if one of the two programming languages includes a feature or features that cannot be mapped to the other. In this case, it may be preferable to execute the operations implemented in the external programming language as written, without converting or porting it to the default programming language of the visual forecasting software (hereinafter "default programming language").

Some examples of the present disclosure can overcome one or more of the abovementioned problems by providing an external-language execution node for a visual forecasting pipeline, where the external-language execution node can allow a user to input external-language program code to be executed as part of the visual forecasting pipeline. After receiving the external-language program code, the system can "wrap" the external-language program code with additional program code that includes definitions, initializations of shared variables, and various post-processing validation checks. The thus-augmented external-language program code can then be executed in a distributed, parallel manner on a number of available execution threads, in which, for example, each execution thread executes a forecasting operation for one or more of the input time series or a subset thereof.

In some examples, the external-language execution node can enable users to easily and quickly insert external-language program code into a pipeline for generating forecasts from an input time series. The external-language execution node, when included in forecasting pipelines, can allow for a comparison of the forecasting methods employed in the external-language execution node with the alternative forecasting methods provided by the visual forecasting software or by other nodes. In some examples, the external-language execution node includes some or all capabilities of the other nodes (e.g., built-in default nodes) provided by the visual forecasting software, such as interactive modeling, data persistence operations, model comparisons, and so on.

The external-language execution node described herein and concordant functionality can provide for significant improvements to existing computerized visual forecasting systems and computers more generally. The ability to add an external-language execution node to a forecasting pipeline in a low-code or no-code framework, such as the drag-and-drop canvas of the present application, can enable faster forecast development with reduced error rates. The techniques of this application can reduce consumption of computing resources by enabling users to use code authored in an external programming language without requiring re-writing of the code in another programming language with potentially lower efficiency. Moreover, the custom code executed in the external programming language can reduce the need for the forecasting software to engage in complex, computationally-intensive conversion or translation operations. Similarly, in some examples, forecasting operations may execute more efficiently when implemented in an external programming language. Thus, the inclusion of external-language execution nodes in a forecasting pipeline may reduce the consumption of computational resources. For instance, external programming languages may include features that can leverage the computational resources of other, additional computing devices using language features such as Remote Procedure Calls (RPCs). In another example, external programming languages may be used to use hardware resources (e.g., graphical processing units (GPUs)) to perform forecasting operations that may be unavailable using the default programming language. The techniques can improve the accuracy of forecasts by expanding the landscape of available models and enable the comparison of forecasting models authored in different programming languages.

In one particular example, a computing device executing visual forecasting software (hereinafter "forecasting software") can generate a GUI including a drag-and-drop canvas. A user can interact with the GUI to select, position, and connect a set of rearrangeable nodes in a sequence that defines a forecasting pipeline for forecasting one or more time series. The forecasting pipeline can represent a sequence of operations for processing the time series to produce forecasts. In this respect, each rearrangeable node in the pipeline can correspond to a respective operation or collection of operations of the sequence of operations. The set of nodes selected by the user can be chosen from a toolkit of available nodes, some or all of which may be built-in default nodes. Among the available nodes in the toolkit can be an external-language execution node, which can be chosen by the user and positioned on the canvas in the pipeline. For example, the user can use an input device such as a mouse to select and insert the external-language execution node into the pipeline. The external-language execution node can be configured to allow the user to insert custom code authored in an external programming language into the forecasting pipeline. For example, the forecasting software may interpret a default programming language, such as a specialized analytics and data manipulation programming language. But the user may desire to execute custom code, such as a forecasting operation written in an external programming language like Python or R, Julia, MATLAB, JavaScript, or other suitable programming language, including compiled programming languages such as C, C++, or Java. The external-language execution node can allow the user to insert such custom code into the pipeline. The custom code may be provided by the user from a source external to the forecasting software. For instance, the custom code may be loaded from a file, network location, or cut and pasted using the system clipboard. The computing system can thus receive the custom code written in the external programming language and associate it with the external-language execution node. For instance, the external-language execution node may correspond to a data structure or memory allocation for storing the custom code.

In addition to forecasting operations, the custom code associated with the external-language execution node can be used for any operation or operations commensurate with the capabilities of the external programming language. For example, the custom code associated with the external-language execution node can be used for data pre-processing, data hygiene, data transformation or formatting, execution of arbitrary algorithms, and so on.

Next, the computing device can receive an input from the user indicating a desire to execute the forecasting pipeline. For example, once some or all elements of the forecasting pipeline are configured, the user may provide an indication to run the pipeline, such as by clicking a "Run" button or the like. In response to receiving the user input, the computing device can generate "wrapped" program code by augmenting the custom code with additional program code. For example, the custom code can have additional program code, which may be written in the external programming language or another language interpretable by the forecasting software, appended to the header and/or footer of the custom code. Custom code that is thus augmented may be referred to as "wrapped custom code." In various examples, the additional program code may be included entirely in the header, entirely in the footer, or in a combination of the two, including both the header and the footer. In some examples, the additional program code may be included partially or entirely within the body of the custom code, in lieu of or in addition to the header and/or footer.

The additional program code can serve various functions, such as initializing shared variables. The shared variables may include one or more input variables corresponding to the external programming language and one or more output variables corresponding to the default programming language of the visual forecasting software. For example, the external programming language Python includes a "dictionary" datatype and the R external programming language includes a comparable "list" datatype. These datatypes (also known as associative arrays) can store key/value pairs and can be used to store values that correspond to variables in the default programming language.

For instance, consider an integer variable "X" in the default programming language to which the value 10 is assigned. A Python dictionary (e.g., named "VF_VARS") may be defined by the additional program code that includes a key "X" and associated value 10. In some examples, when the value of the variable X is changed in the default programming language (e.g., using an assignment such as "X=20"), the value associated with key "X" in the "VF_VARS" Python dictionary may be automatically updated. Conversely, when the value associated with key "X" in the "VF_VARS" Python dictionary is updated using the external programming language, the value of the variable X can be automatically updated. This example corresponds to "two-way" shared variables, but similar mechanisms may be used for "one-way" shared variables. Other methods of implementing shared variables between the external programming language and the default programming language may be similarly used. Additionally, although this example involves associative arrays, shared variables may be used for any datatype for which a suitable correspondence exists between a datatype of the external programming language and a datatype of the default programming language. For instances, shared variable datatypes can include scalars, arrays, matrices, strings, Booleans, objects, and so on.

The one or more input variables may include input information to be provided by the forecasting software to the wrapped custom code. Conversely, the one or more output variables can include output information to be provided from the wrapped custom code to the forecasting software. The shared variables can thus provide a means to pass information from the forecasting software into the wrapped custom code and from the wrapped custom code back out to the forecasting software. In particular, one shared variable can be assigned or populated by the wrapped custom code following execution that includes the results of the forecasting operation.

The forecasting pipeline can then execute as a sequence of operations corresponding to the arrangement, ordering, connections, etc. of the nodes arranged on the drag-and-drop canvas. Part of the execution of the pipeline may include the execution of wrapped custom code associated with the external-language execution node. The computing device can provide the wrapped custom code to a set of execution threads for execution. The set of execution threads may be configured to execute the wrapped custom code as part of the forecasting pipeline to generate the forecasts. Each execution thread of the set of execution threads can execute the wrapped custom code to perform forecasting operations based on the input time series data or a subset thereof.

For example, the computing device may include components such as multithreaded processors that can be configured to execute numerous, simultaneous parallel processes. In some examples, the execution threads can be distributed. For example, the forecasting software can execute in a cloud environment with scalable processing power available on-demand. In that case, the execution threads may be distributed according to the configuration of the cloud provider.

The computing device can then output the one or more forecasts in the GUI. For example, following completion of the execution of the wrapped custom code, the results of the forecasting operations may be assigned to a shared variable. In addition, in some examples, one or more confidence computations, such as confidence limits, standard error, or confidence intervals, associated with the forecasting operations performed by the wrapped custom code may also be computed by the wrapped custom code and similarly output using shared variables. The output forecasts can be used by the forecasting software to generate charts, reports, dashboards, and so on. In some examples, the results of the forecasting operations output by the wrapped custom code can be compared to alternative forecasting operations performed by the forecasting software and compared to determine the most accurate or effective "champion" forecasting model.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
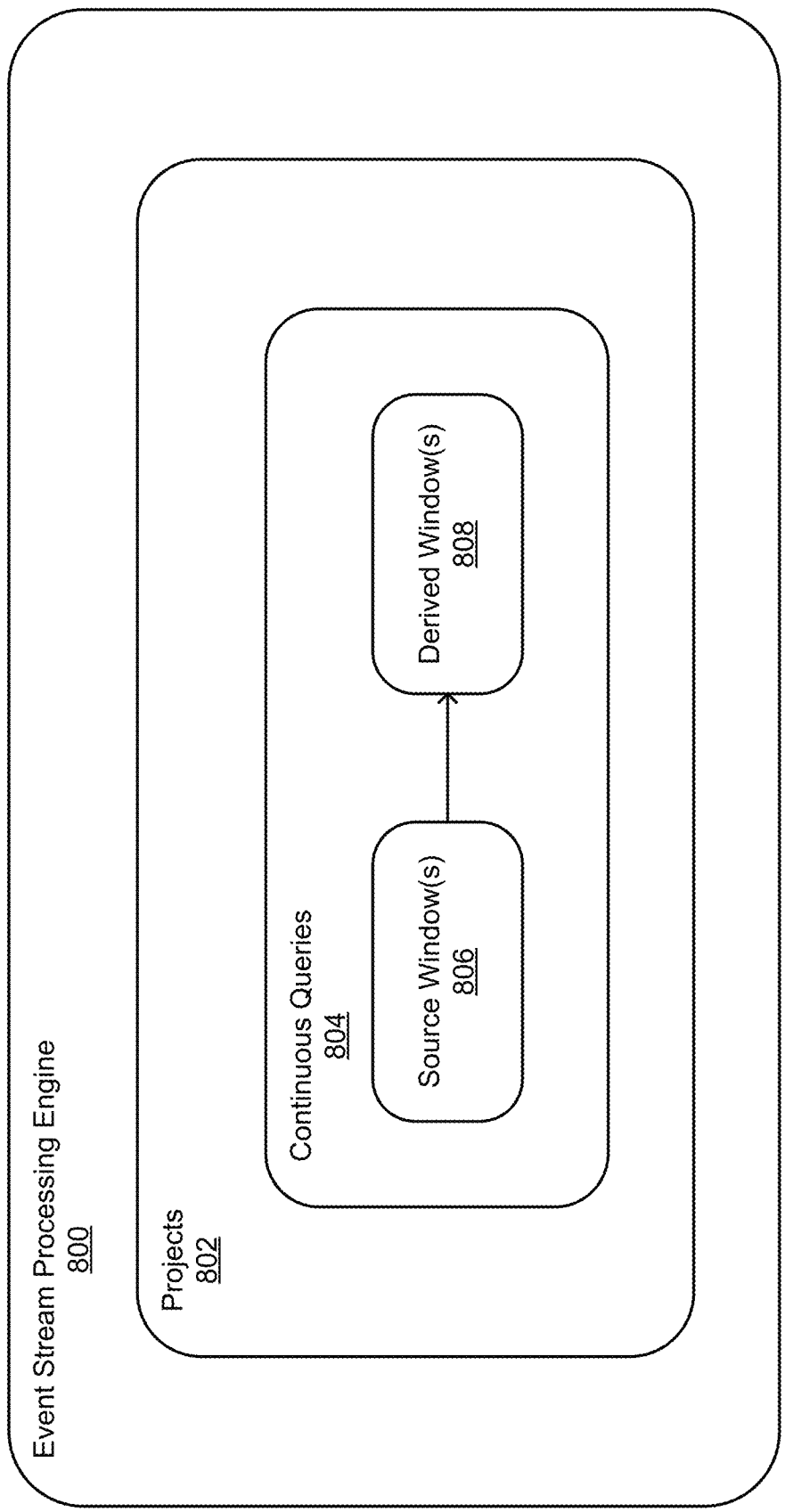
FIG. 8 shows a block diagram including components of an Event Stream Processing Engine (ESPE) according to some aspects of the present disclosure.
Figure 9:
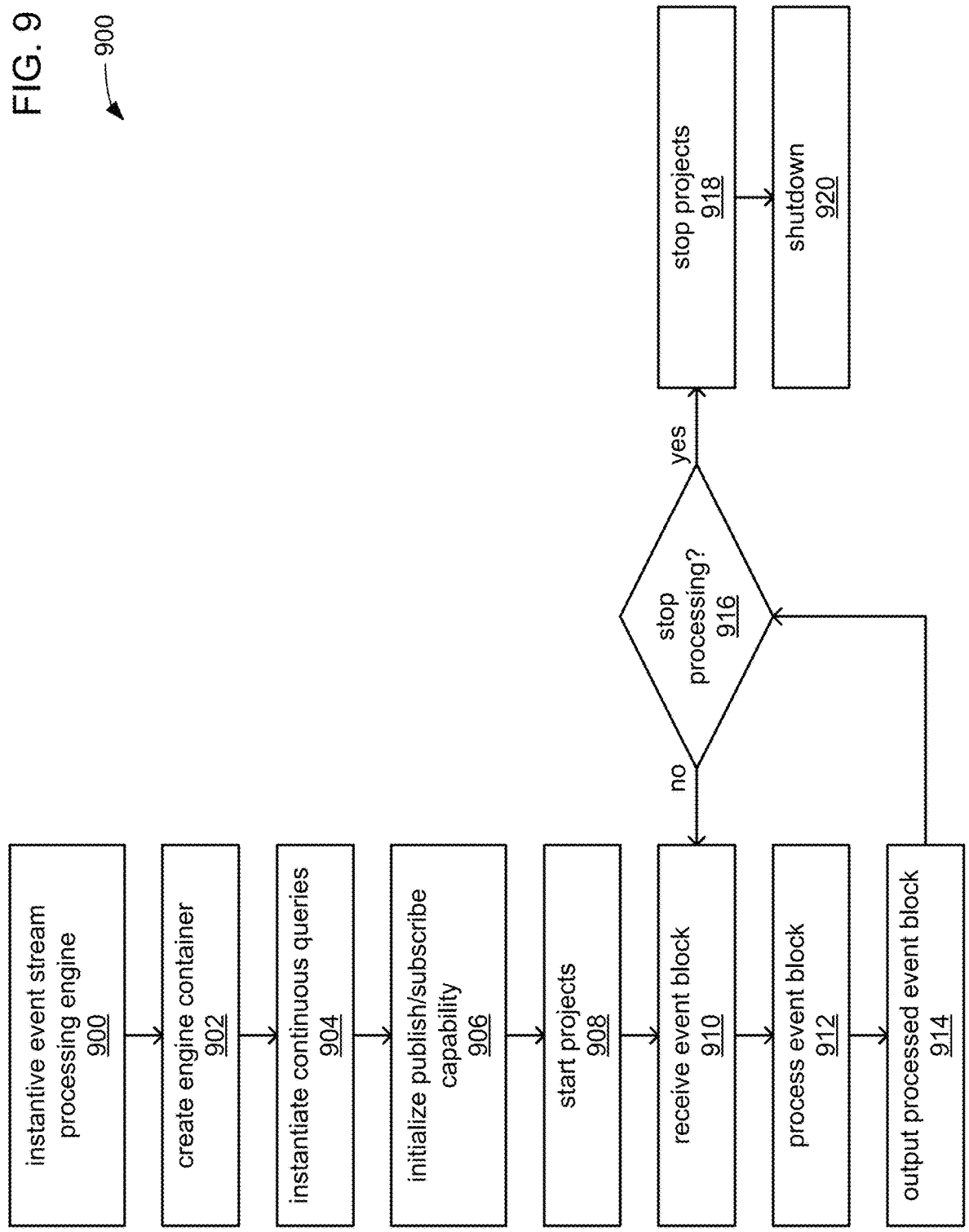
FIG. 9 shows a flow chart of an example process including operations performed by an event stream processing engine according to some aspects of the present disclosure.
Figure 10:
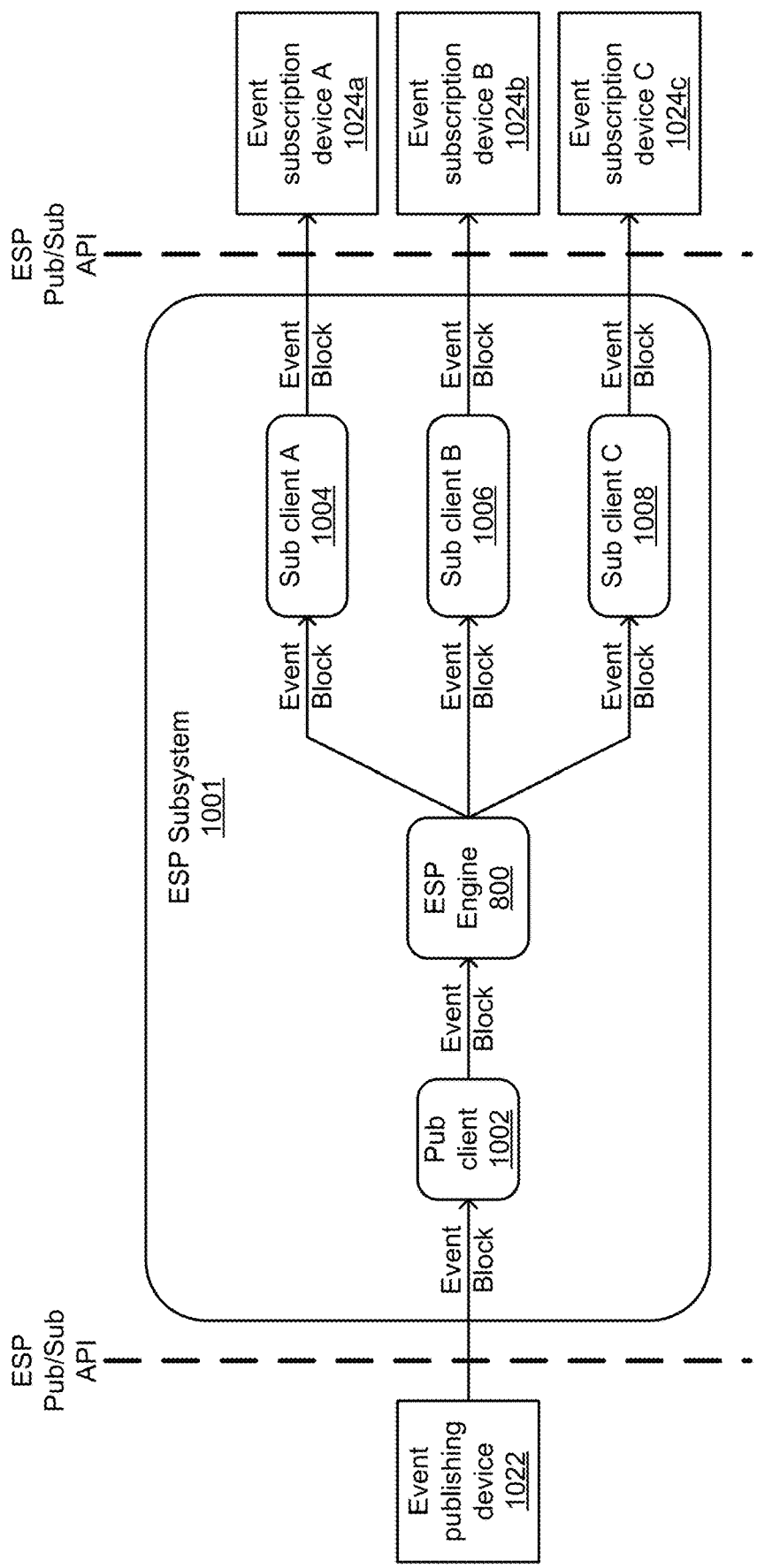
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein.

Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
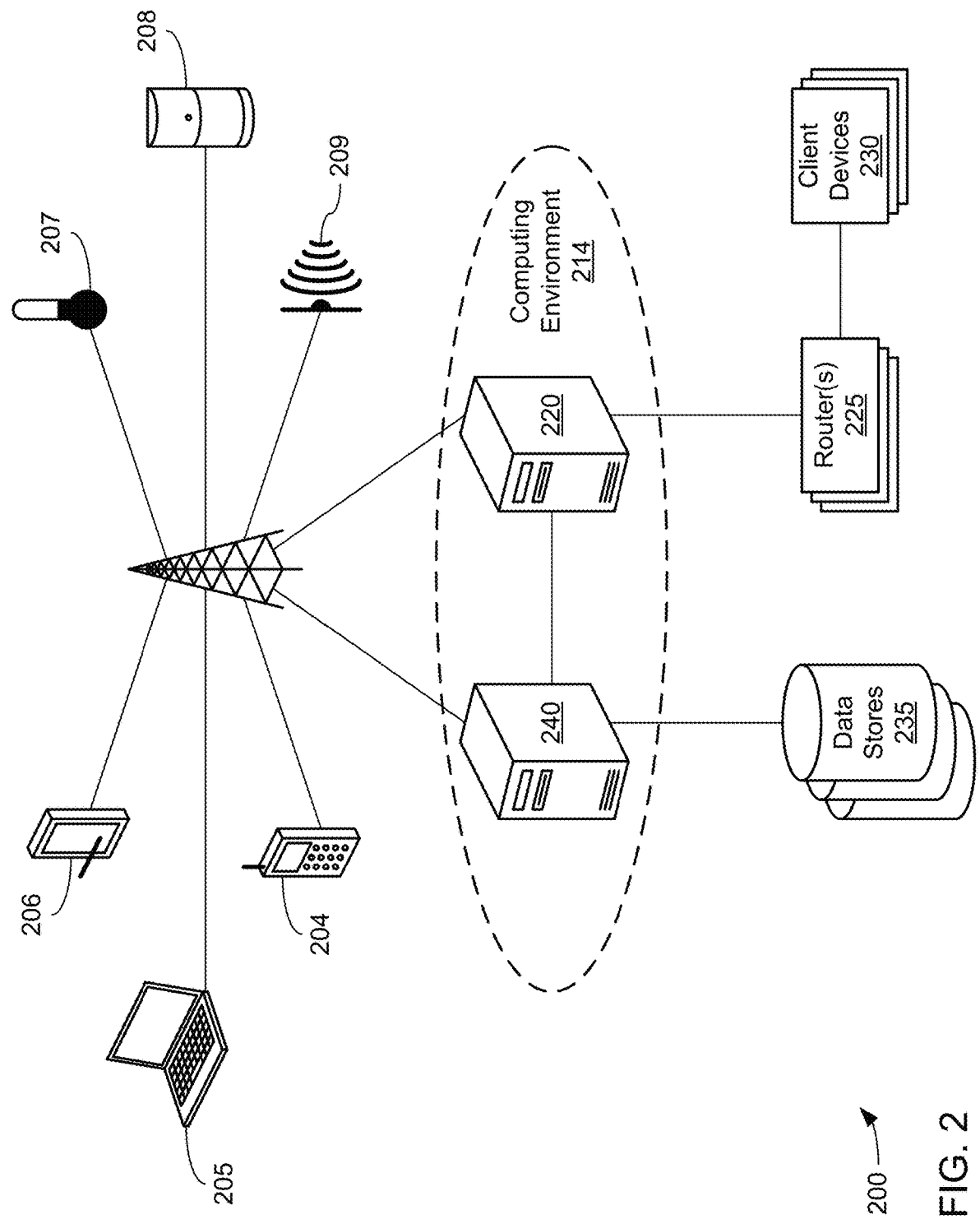
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computer systems (e.g., a home computer, a laptop computer, a tablet, a personal digital assistant (PDA), a computer system, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
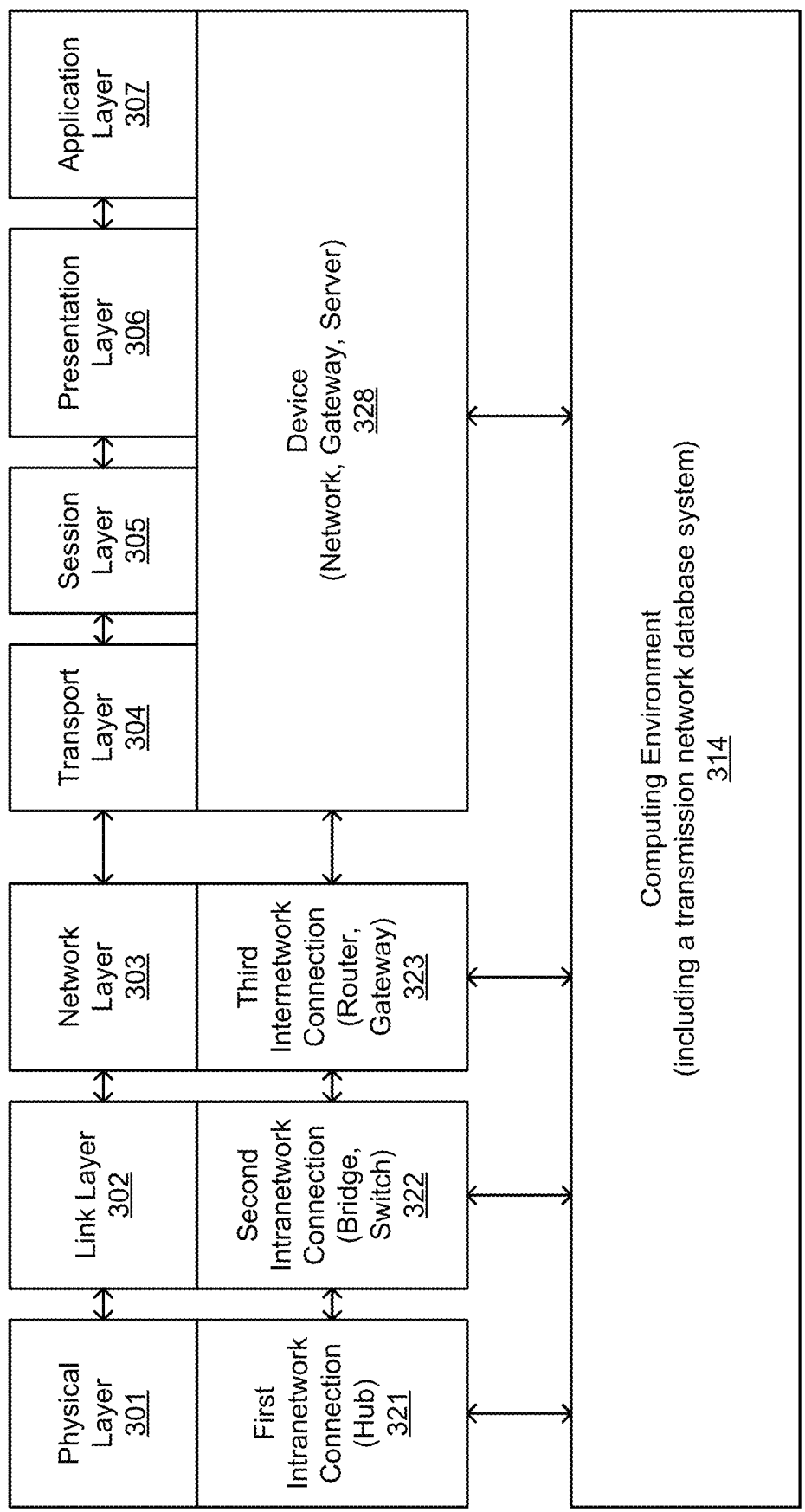
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
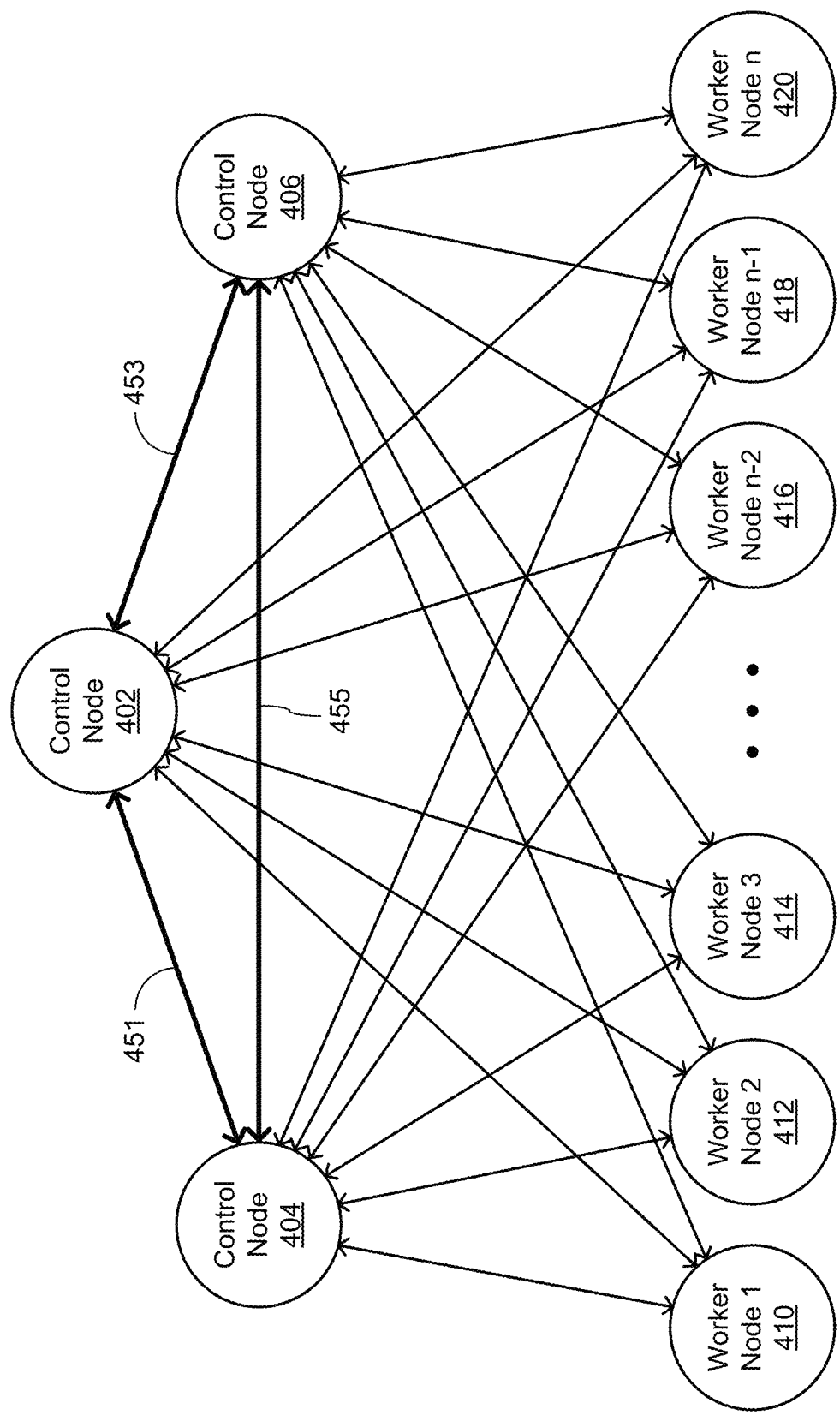
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others.

While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
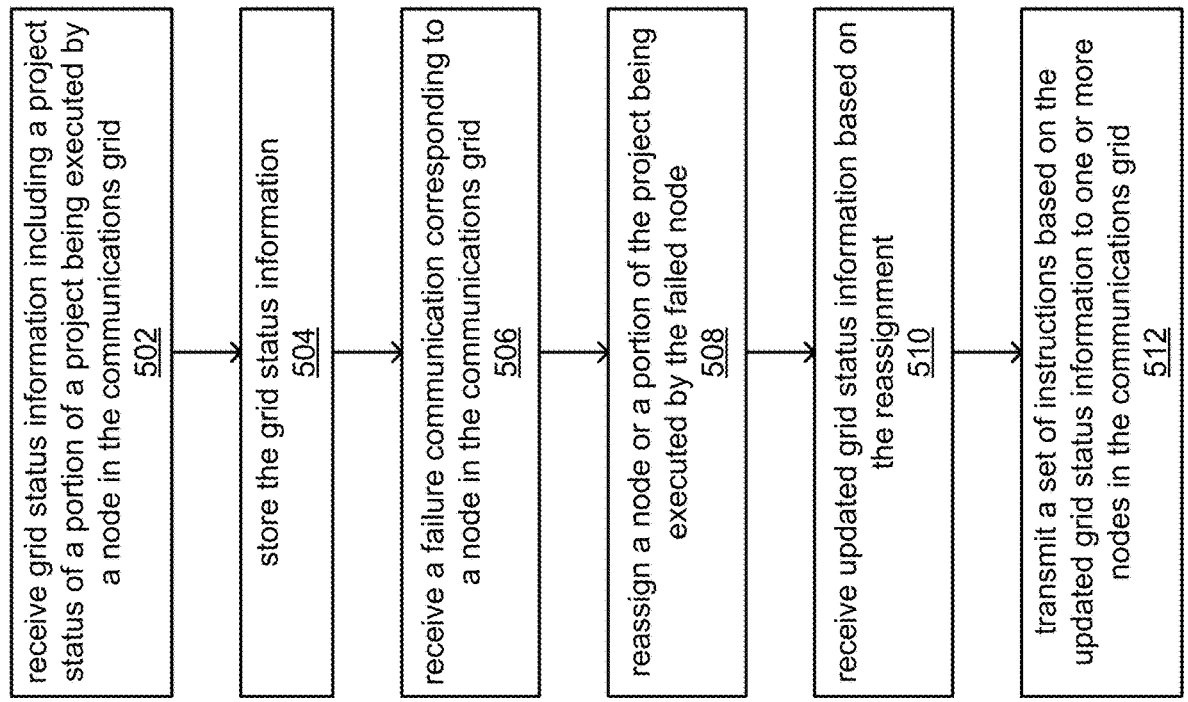
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
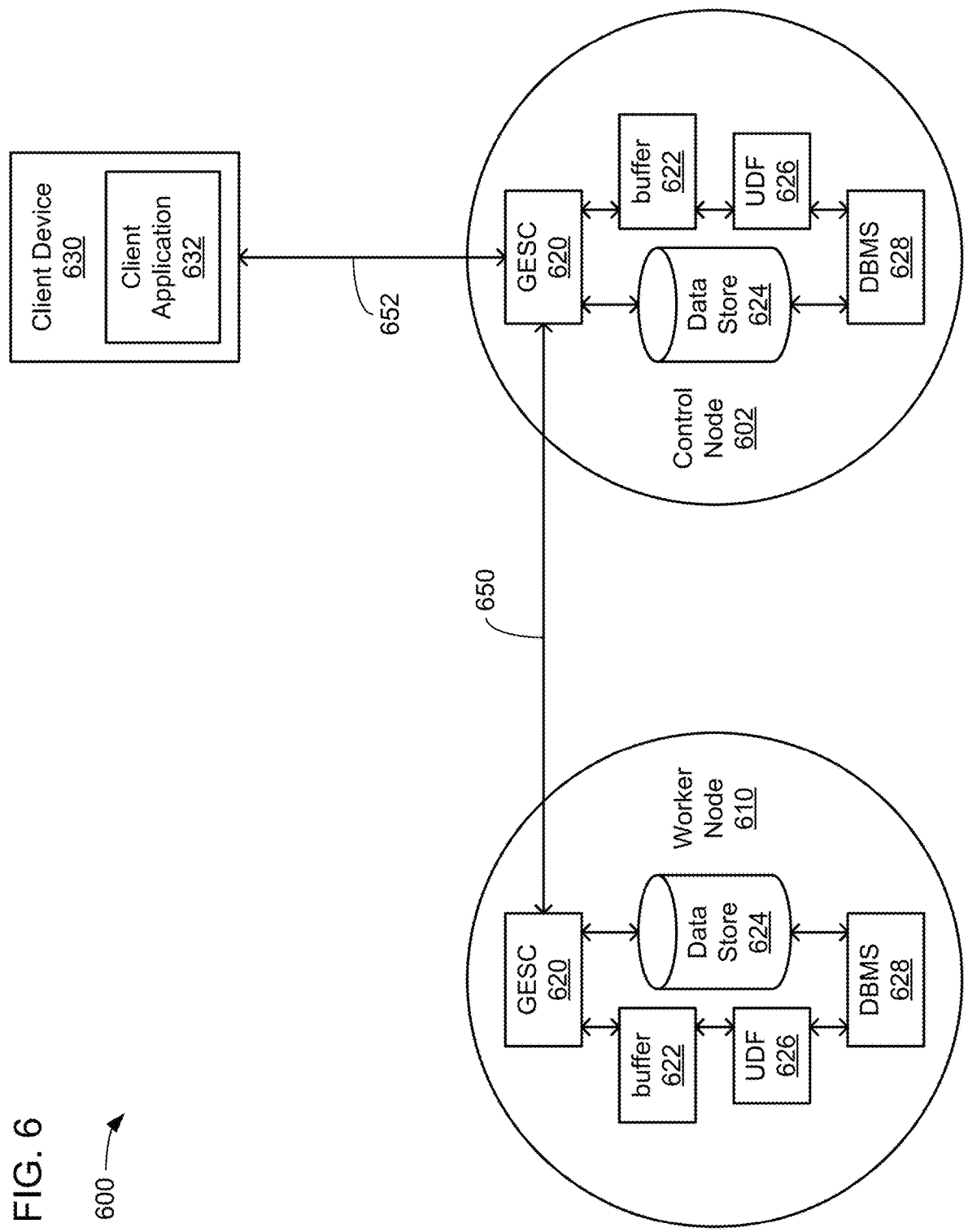
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
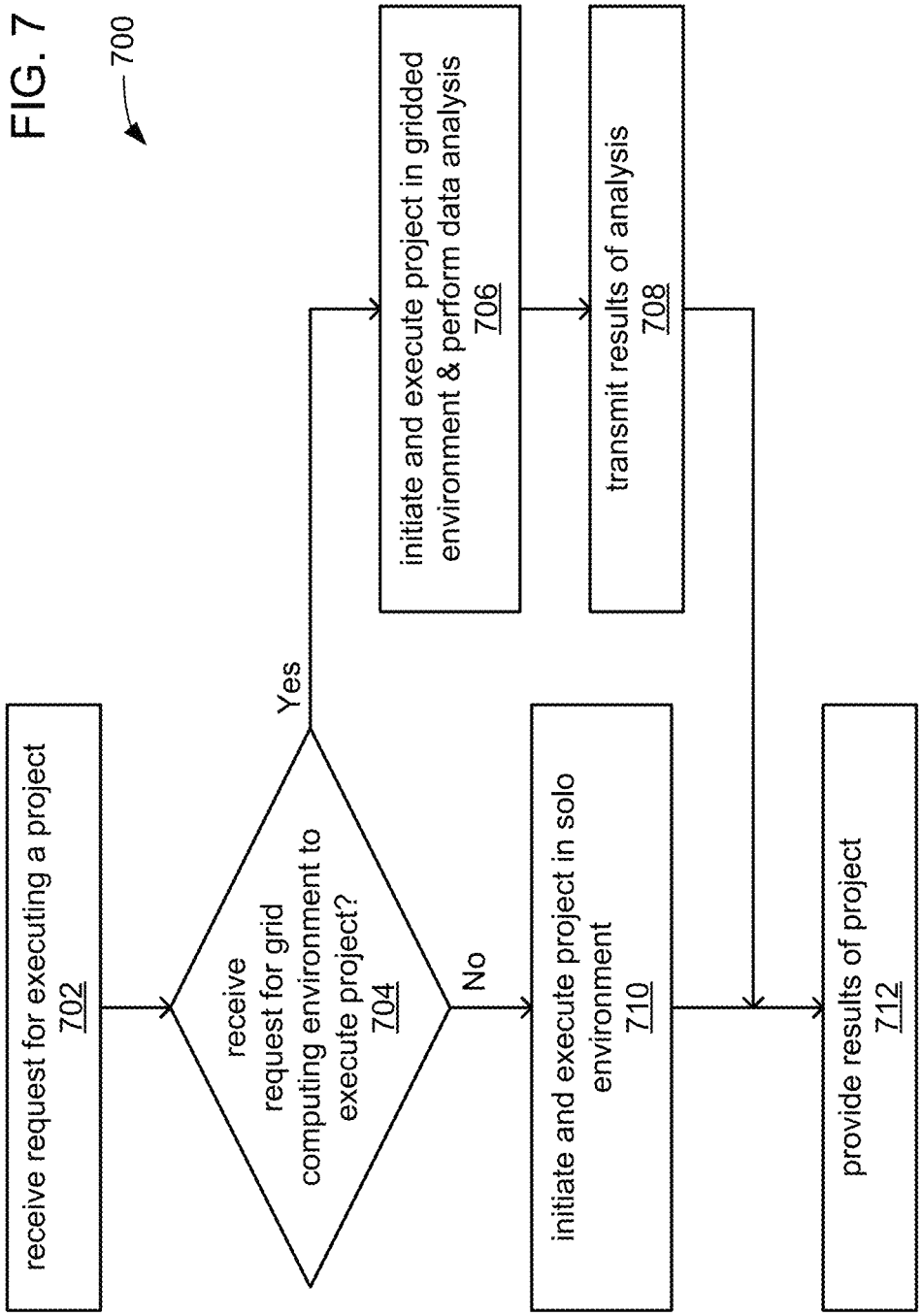
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computer system of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computer systems of the event subscribing devices 1024*a*-*c*. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computer system. The computer system includes, but is not limited to, a processor and a computer-readable medium operably coupled to the processor. The processor is configured to execute an ESP engine (ESPE). The computer-readable medium has instructions stored thereon that, when executed by the processor, cause the computer system to support the failover. An event block object is received from the ESPE that includes a unique identifier. A first status of the computer system as active or standby is determined. When the first status is active, a second status of the computer system as newly active or not newly active is determined. Newly active is determined when the computer system is switched from a standby status to an active status. When the second status is newly active, a last published event block object identifier that uniquely identifies a last published event block object is determined. A next event block object is selected from a non-transitory computer-readable medium accessible by the computer system. The next event block object has an event block object identifier that is greater than the determined last published event block object identifier. The selected next event block object is published to an out-messaging network device. When the second status of the computer system is not newly active, the received event block object is published to the out-messaging network device. When the first status of the computer system is standby, the received event block object is stored in the non-transitory computer-readable medium.

Figure 11:
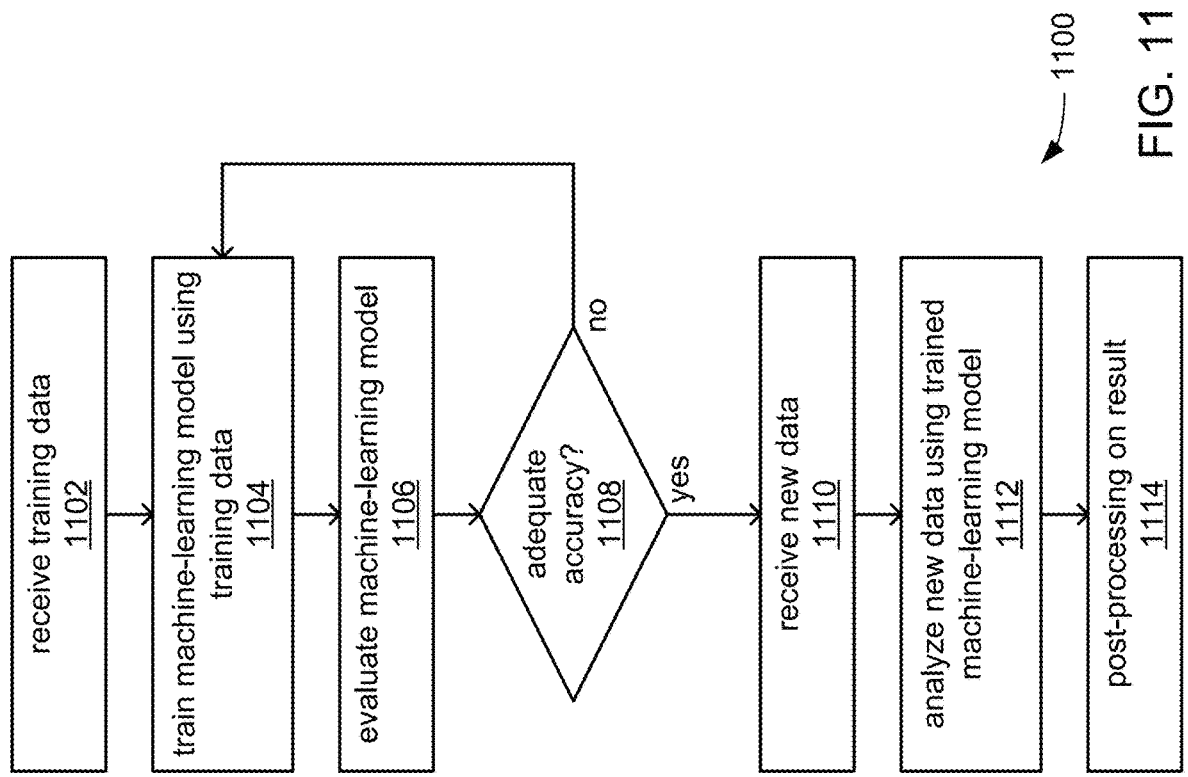
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion;

playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
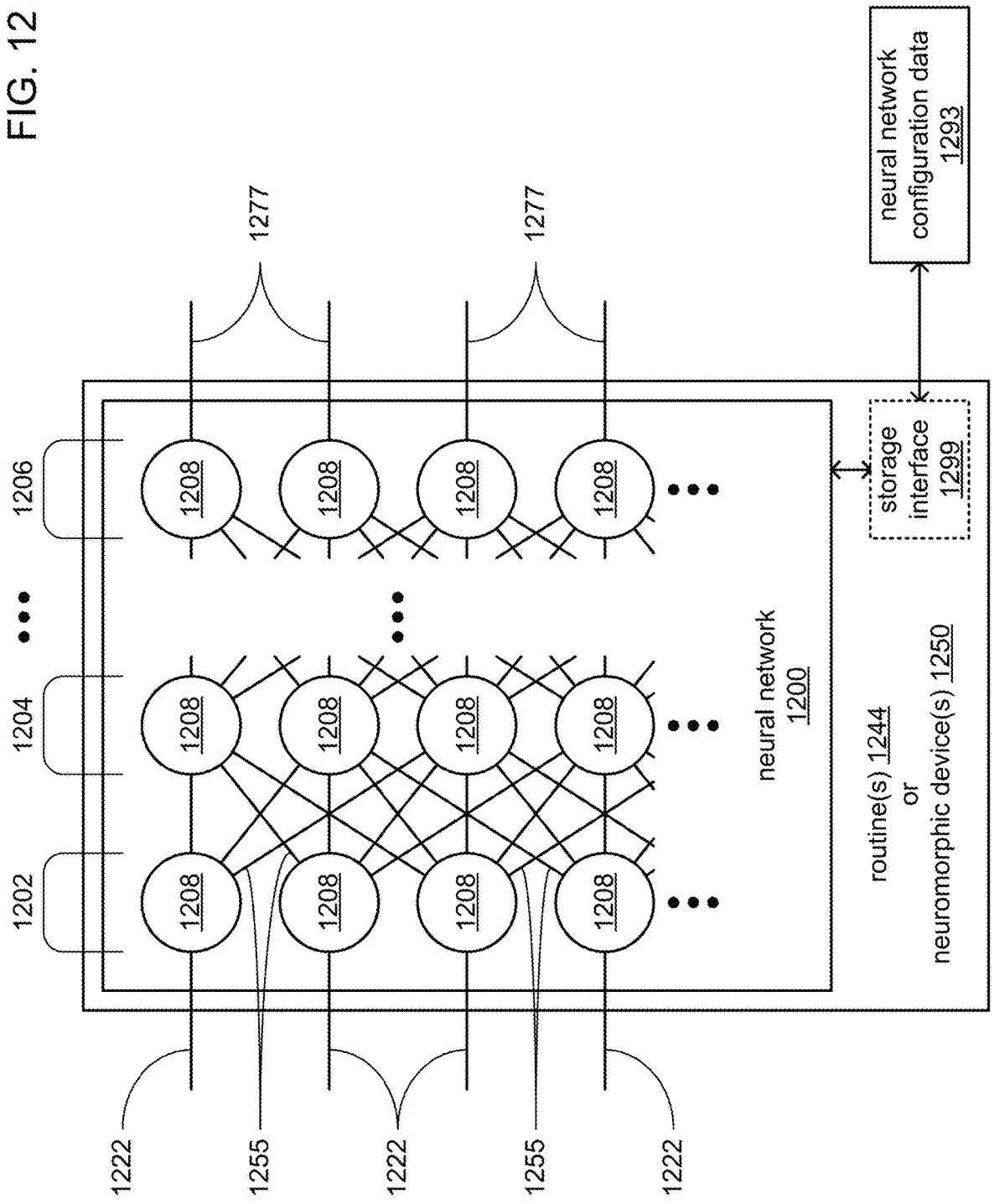
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max(x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computer system or multiple computer systems, such as the communications grid computing system 400 discussed above.

Implementing some examples of the present disclosure at least in part by using machine-learning models can reduce the total number of processing iterations, time, memory, electrical power, or any combination of these consumed by a computer system when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
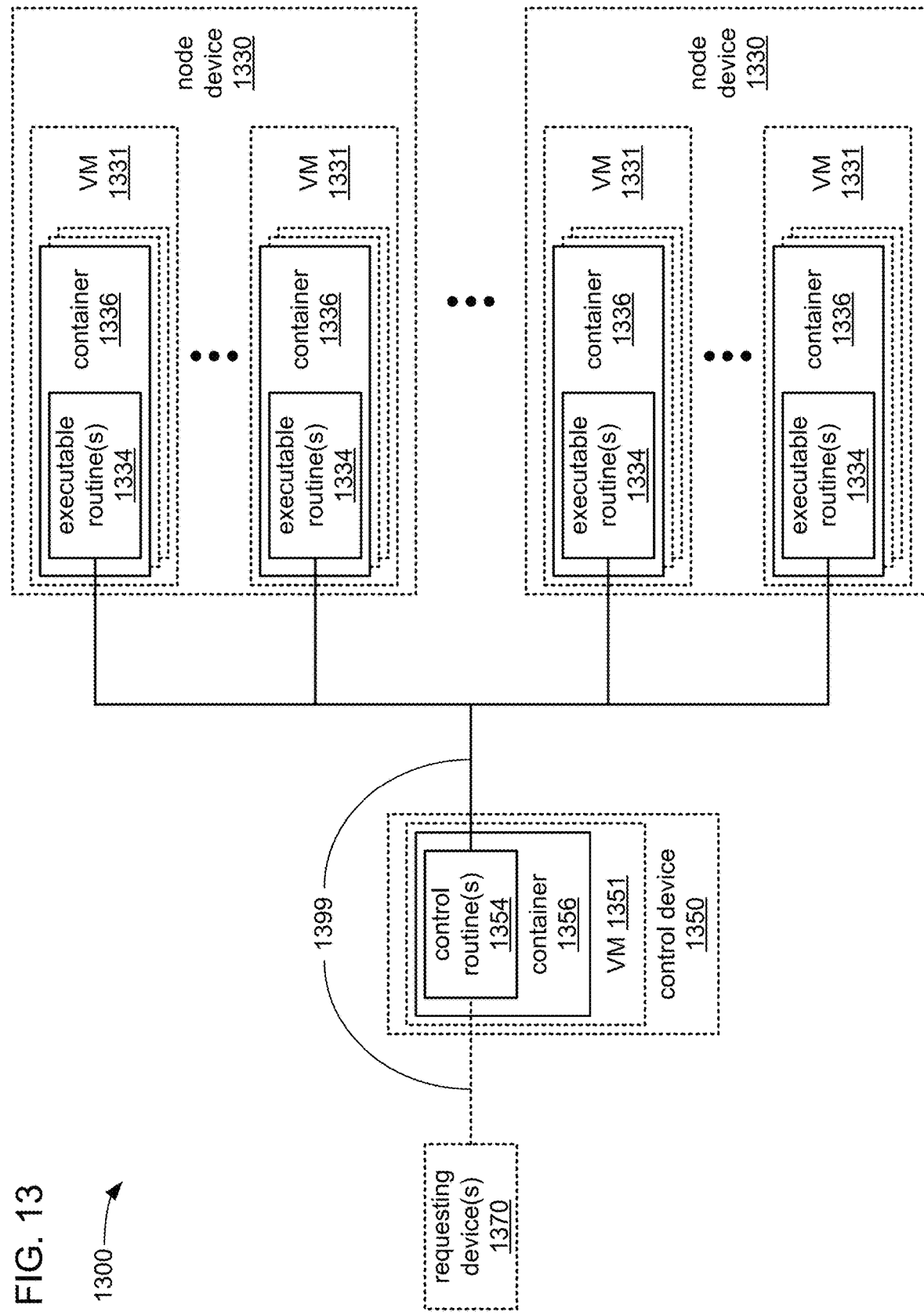
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
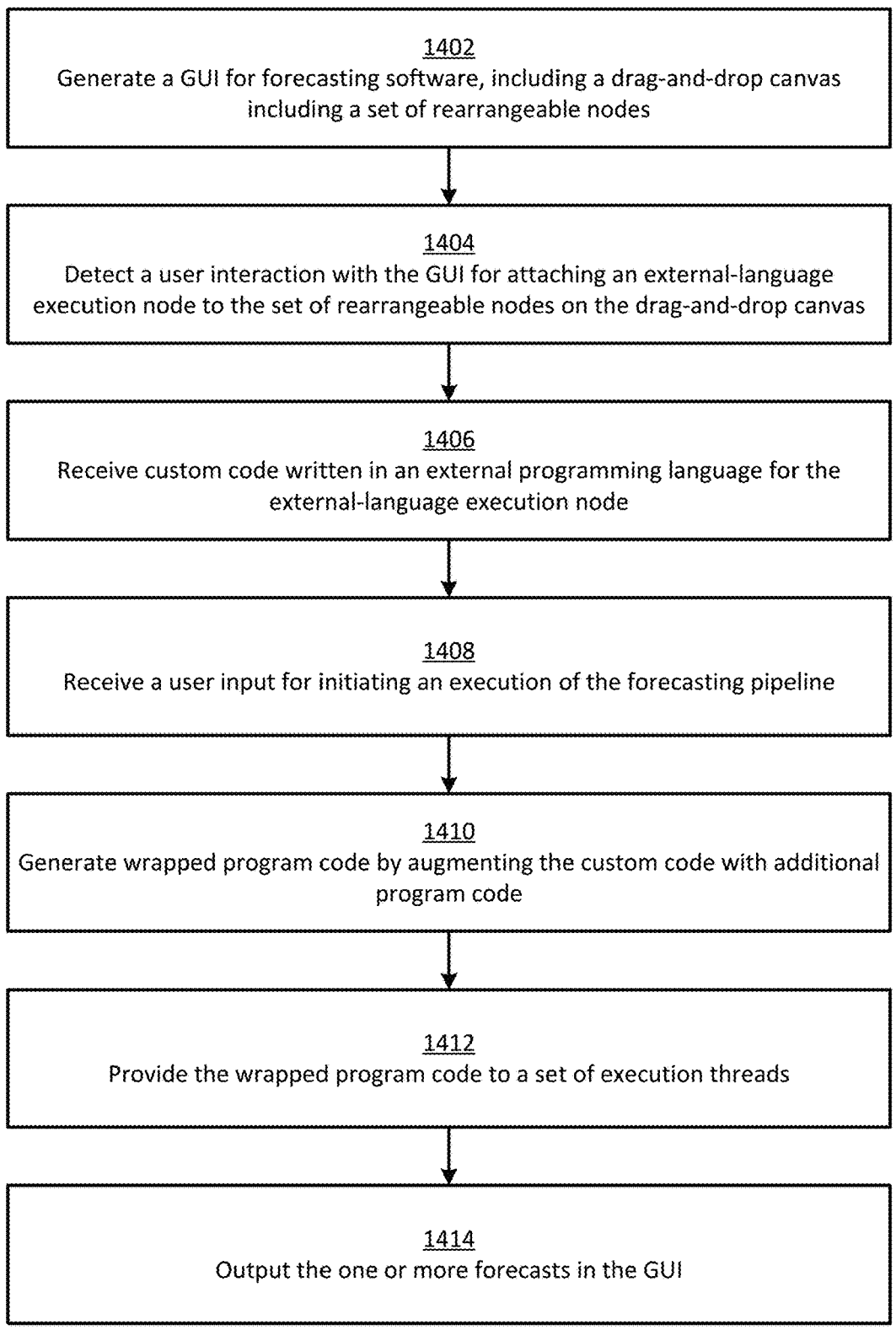
FIG. 14 shows a flowchart of an example of a process for constructing a visual forecasting pipeline including an external-language execution node for executing external-language program code as part of the visual forecasting pipeline, according to some aspects of the present disclosure.

FIG. 14 shows a flowchart of an example of a process for constructing a visual forecasting pipeline including an external-language execution node for executing external-language program code as part of the visual forecasting pipeline, according to some aspects of the present disclosure. Other examples may involve more operations, fewer operations, different operations, or a different order of operations than is shown in FIG. 14.

In block 1402, a computer system generates a graphical user interface (GUI) for forecasting software. For example, the forecasting software may be visual forecasting software that can be used for time series analysis and generation of forecasts through interactive visualizations and automated analytical models. The GUI may include a drag-and-drop canvas including a set of rearrangeable nodes. The set of rearrangeable nodes can define a forecasting pipeline that can be used for forecasting one or more time series. For instance, the rearrangeable nodes can represent processing steps or analytical tasks, such as data preparation, feature engineering, model selection, or evaluation. The one or more time series may include time series data that is input to the forecasting software, or subsets of the time series data determined using a suitable partitioning scheme.

The forecasting pipeline can thus involve a sequence of operations for processing the one or more time series to produce one or more forecasts. Each rearrangeable node in the set of rearrangeable nodes corresponding to a respective operation of the sequence of operations. For example, the forecasting pipeline can provide a visual representation of the sequence of operations that is easily understandable. Moreover, the drag-and-drop canvas can facilitate intuitive, rapid creation and editing of forecasting pipelines and components.

In block 1404, the computer system detects a user interaction with the GUI for attaching an external-language execution node to the set of rearrangeable nodes on the drag-and-drop canvas in relation to the forecasting pipeline. For example, a user of the forecasting software may click a button, select a menu option, or other suitable UI action to provide an indication directing the creation of a new external-language execution node or to edit an existing external-language execution node.

The external-language execution node can be used, for example, to insert custom code defined using an external programming language into the forecasting pipeline. In this context, the external programming language refers generally to a programming language that is different than the default programming language. For instance, the user may wish to execute a forecasting model written in Python, R, Julia, MATLAB, JavaScript, or other programming language, including compiled languages such as C, C++, or Java, in lieu of or along with the forecasting models provided by the forecasting software. Since conversion of such custom code to a default programming language may be wasteful, impractical, or impossible, the external-language execution node can enable the custom code to be executed as part of the forecasting pipeline.

In block 1406, the computer system receives the custom code written in the external programming language for the external-language execution node. For example, the custom code can be provided to the forecasting pipeline by the user of the GUI. The custom code can originate from a source external to the forecasting software. For example, the custom code can be drafted by the user, downloaded from a network location or online repository, loaded from disk, or obtained from any other suitable source outside the forecasting software. In some examples, the forecasting software may provide an embedded editor or the like for loading, editing, and/or selecting the custom code. The embedded editor may be displayed in response to the user interacting with the external-language execution node or another interface component of the GUI. Once the embedded editor is displayed, the user can select or insert (e.g., copy and paste, or write) the custom code using the embedded editor.

In block 1408, the computer system receives a user input for initiating an execution of the forecasting pipeline. For example, a user of the forecasting software may click a button, select a menu option, or other suitable UI action to trigger the execution of the forecasting pipeline. In some examples, the user input may include additional instructions or configurations (e.g., relating to subsets of the input time series, designation of portions of the forecasting pipeline to execute, execution parameters, and so on) that can affect the execution of the forecasting pipeline.

In block 1410, the computer system, in response to receiving the user input, can generate wrapped custom code by augmenting the custom code with additional program code. For example, a header and/or footer may be appended to the custom code. The additional program code may be written in the external programming language, the default programming language, and/or another programming language that includes suitable language constructs for acting as a bridge between the wrapped custom code and the forecasting software.

The additional program code can include shared variables. In this context, a shared variable refers to a variable that is accessible by program code executed by the forecasting software and the wrapped custom code. The names and values of shared variables may be displayed in the GUI and configurable therein by the user, for example as part of the process for configuring the forecasting pipeline. For example, the output of the external-language execution node may be a shared variable whose populated value can be directed into another node using the drag-and-drop canvas. For instance, the external-language execution node can be connected in the forecasting pipeline to a graphical viewer. Because of this connection, the output of the external-language execution node can be passed to the graphical viewer, which in turn can plot a graph of the output. An example of the output may be a value for a populated shared variable.

The shared variables may include one or more input variables corresponding to the external programming language and one or more output variables corresponding to the first default programming language. In some examples, the shared variables can be mutually accessed in both the external programming language and the default programming language. In these examples, the same variable may be available to both the external programming language and the default programming language. The one or more input variables include input information to be provided by the forecasting software to the wrapped custom code. The one or more output variables include output information to be provided from the wrapped custom code to the forecasting software. In some examples, the shared variables act as two-way doors that allow information to be passed into the wrapped custom code using the shared input variables and allow information to be passed out of the wrapped custom code using the shared output variables. In some other examples, the shard variables are only accessible from either the external programming language or the default programming language. In this case, the shared variables act as one-way doors that allow information to be passed in only one direction (e.g., passed into the wrapped custom code but not passed out of the wrapped custom code).

In block 1412, the computer system provides the wrapped custom code to a set of execution threads. For example, following the user input for initiating an execution of the forecasting pipeline, the forecasting software can determine the available execution threads and the status thereof. For instance, the forecasting software can access information about available thread pools using an application programming interface (API) provided by the underlying operating system. In some examples, distributed execution threads can be used in which the executions are partitioned across multiple processors, virtual machines, cloud-based servers, etc., and are not necessarily all co-located.

The set of execution threads can be configured to execute the wrapped custom code as part of the forecasting pipeline to generate the one or more forecasts. For instance, the forecasting software may determine a suitable partition of the workload of the forecasting pipeline and the components thereof. The suitable partition may be based on portions of the workload that can be executed in parallel that lack interdependencies. The wrapped custom code may, for example, execute forecasting models over a number of subsets of the input time series. Each forecasting operation implemented by the wrapped custom code may be executable independently and thus can be executed on a standalone execution thread.

In block 1414, the computer system outputs the one or more forecasts in the GUI. For example, the forecasts may be output to the GUI as raw data, charts, graphs, reports, dashboards, and so on. The forecasting pipeline can be configured (e.g., using a suitable node therein) to perform post-processing on the forecasts prior to visualization or tabulation.

Figure 15:
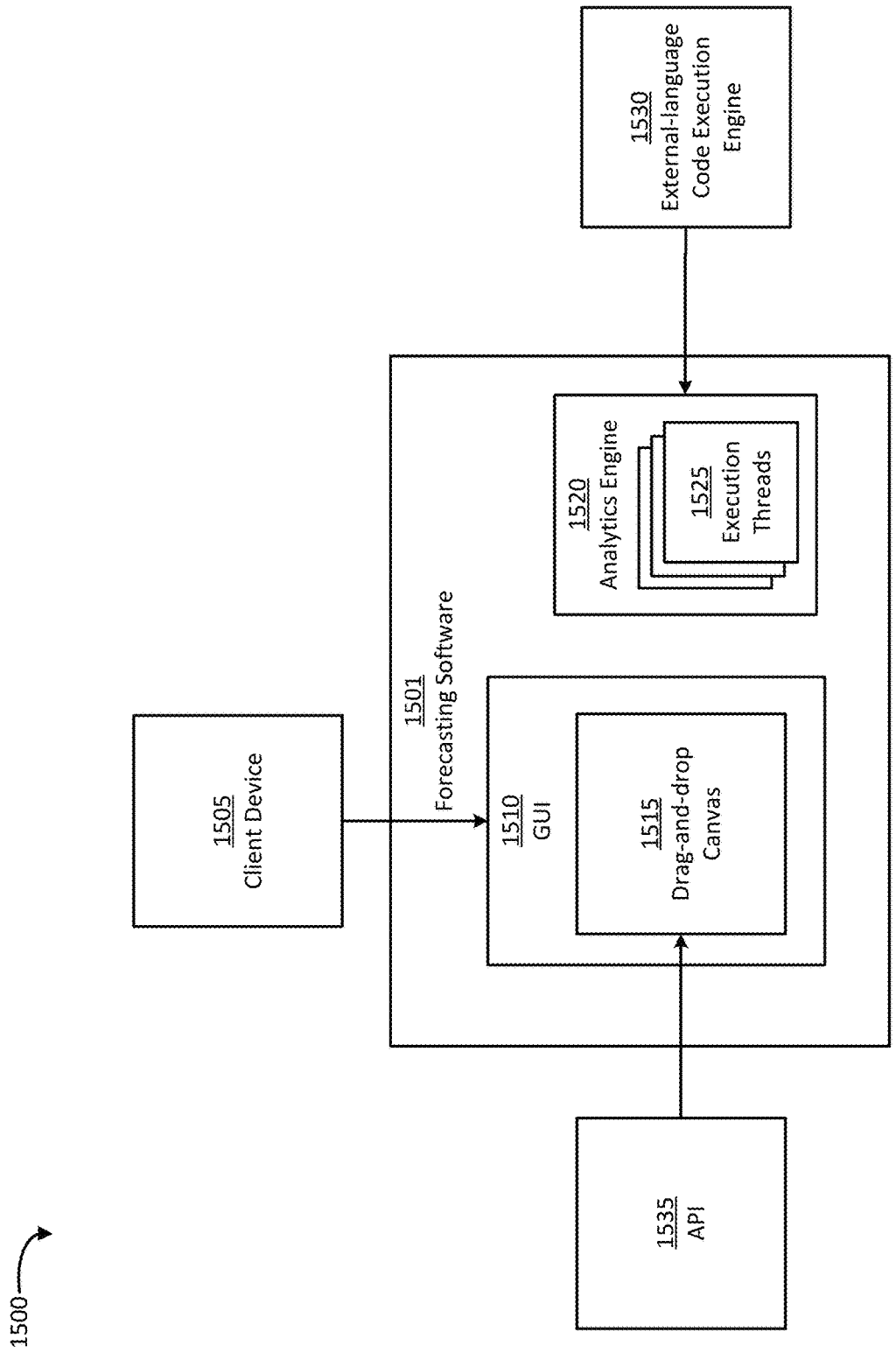
FIG. 15 shows an example of a system that can be used for constructing a visual forecasting pipeline including an external-language execution node, according to some aspects of the present disclosure.

Turning now to FIG. 15, FIG. 15 shows an example of a system 1500 that can be used for constructing a visual forecasting pipeline including an external-language execution node, which can be used to insert external-language program code into the visual forecasting pipeline, according to some aspects of the present disclosure. The system 1500 may be deployed on one or more computing devices, such as a cloud computing system or computing cluster containing any number of computing nodes. The components depicted in the example system 1500 may be hosted together, separately, or any combination thereof. For instance, the analytics engine 1520 and the external-language code execution engine 1530 may be communicatively coupled software components executed on disparate computer systems.

System 1500 includes forecasting software 1501. Forecasting software 1501 may be a component of an analytics platform or may be a standalone software component. The forecasting software 1501 may include visualization components that enable the creation and customization of forecasting pipelines on a drag-and-drop canvas 1515. The forecasting software 1501 can perform time series modeling and generate predictions using dynamic visual interfaces.

For example, the forecasting software 1501 can provide a GUI 1510. In some examples, the GUI 1510 can be provided by way of a web application hosted by forecasting software 1501. For instance, the forecasting software 1501 may be executing in a cloud environment. In that case, the forecasting software 1501 can be configured, operated, and maintained using a GUI 1510 that is a component of a web application executing in the cloud environment. The GUI 1510 can then be accessed using client device 1505 using, for example, a web browser. In some examples, the forecasting software 1501 may have an associated native client application that can be executed on the client device 1505 that may likewise provide a GUI 1510. In some examples, the GUI 1510 can be provided using a third-party interface and populated using information obtained from the forecasting software 1501 using, for example, a web-based API.

The GUI 1510 may include a drag-and-drop canvas 1515. The drag-and-drop canvas 1515 can be for receiving a set of rearrangeable nodes defining a forecasting pipeline for forecasting one or more time series. A user can select, position, connect, and rearrange the set of nodes on the canvas. The user can select the set of nodes from a toolkit of available nodes, which may primarily include built-in nodes that are provided by default in the forecasting software 1501. The forecasting pipeline can define, for example, a sequence of operations for processing the one or more time series to produce forecasts. The forecasting software 1501 can likewise include a set of controls suitable for manipulating the pipeline and its constituent nodes such as controls for creating, viewing, editing, and deleting nodes.

The system 1500 can include an analytics engine 1520 for executing the pipeline designed by using the drag-and-drop canvas 1515. For example, the forecasting pipeline may include nodes that perform time series and modeling, generation of predicted time series values, model comparisons, error analysis, and so on. The analytics engine 1520 can include components for executing certain nodes of the forecasting pipeline in their defined sequence.

The analytics engine 1520 may also be configured to interpret a particular programming language, which can be used by the user to draft custom operations within the context of the forecasting software 1501. For instance, the analytics engine 1520 may interpret a default programming language of the forecasting software 1501. A user can write program code in the particular programming language in an editor of the forecasting software 1501 to define the custom operations. Examples of the custom operations can include data manipulation, statistical analysis, and report generation. But the particular programming language may have limited adoption, may be narrowly suited for certain use cases, or may otherwise be suboptimal for the user's intended purpose. Some examples of the present disclosure can help overcome these limitations via an external-language execution node and associated functions, as described in greater detail below.

The analytics engine 1520 may include one or more execution threads 1525. Although depicted as a component of the analytics engine 1520 in FIG. 15, the one or more execution threads 1525 may be located on remote servers or cloud execution environments and accessible by analytics engine 1520 using a suitable abstraction. For example, the one or more execution threads 1525 may be managed using thread pools including references or links to one or more execution threads 1525. Other abstractions include direct manipulation of threads, futures and promises, an actor-based architecture, and so on.

In some examples, the forecasting software 1501 can include an external-language execution code as one of the available nodes that can be added to the forecasting pipeline. A user can add one or more of the external-language execution nodes to appropriate locations in the forecasting pipeline using the drag-and-drop canvas 1515. The external-language execution nodes can be used for inserting custom code written in an external programming language into one or more locations of the forecasting pipeline. The custom code for the external-language execution nodes can be added using a suitable editor or loaded from an external source.

While the analytics engine 1520 may execute some components of the forecasting pipeline, including execution of program code written using the default programming language, it may not be able to natively execute the external programming language. Thus, some examples can provide an external-language code execution engine 1530 for use in executing of the custom code written in the external programming language. For example, the external-language code execution engine 1530 can be used to spawn processes for executing the custom code written in the external programming language using runtime components for the respective programming languages.

The analytics engine 1520 can generate wrapped custom code prior to execution by the external-language code execution engine 1530 by augmenting the custom code with additional program code. For example, the analytics engine 1520 can augment the custom code with additional program code that enables execution of the custom code as well as the sharing of information between the analytics engine 1520 and the external-language code execution engine 1530. For instance, the additional program code may include shared variables that can be used to pass data (e.g., forecasting configurations) from the analytics engine 1520 into the executing wrapped custom code or to pass data (e.g., forecasting results) out of the executing or executed wrapped custom code back to the analytics engine 1520.

The analytics engine 1520 may include components for appending a header and/or footer to the custom code. The appended code may be written in the external programming language or it may be in a programming language interpreted by the analytics engine 1520, such as the default programming language. For example, the analytics engine 1520 may include components that can receive the custom code as one or more text strings, process the one or more text strings, and then append additional program code to the beginning and/or the end of the custom code. In another example, the analytics engine 1520 may add annotations throughout the custom code.

The analytics engine 1520 can coordinate the execution of the spawned process or other suitable abstractions for encapsulated execution of the wrapped custom code using the execution threads 1525. In some examples, the analytics engine 1520 can execute the code associated with the various nodes of the forecasting pipeline including wrapped custom code associated with external-language execution nodes using the execution threads 1525.

In some examples, an API 1535 such as a web-based representational state transfer (REST) API can be used to provide the custom code associated with the external-language execution nodes. For example, the API 1535 may expose an API service endpoint to which, given the appropriate credentials and identifiers, custom code can be sent. Then, in accordance with the provided identifiers, the custom code can be assigned to a specified external-language execution node in a specified forecasting pipeline. In some examples, the API 1535 can be used for creation of and population of a new external-language execution node, editing existing external-language execution nodes, deleting external-language execution nodes, and so on.

Figure 16:
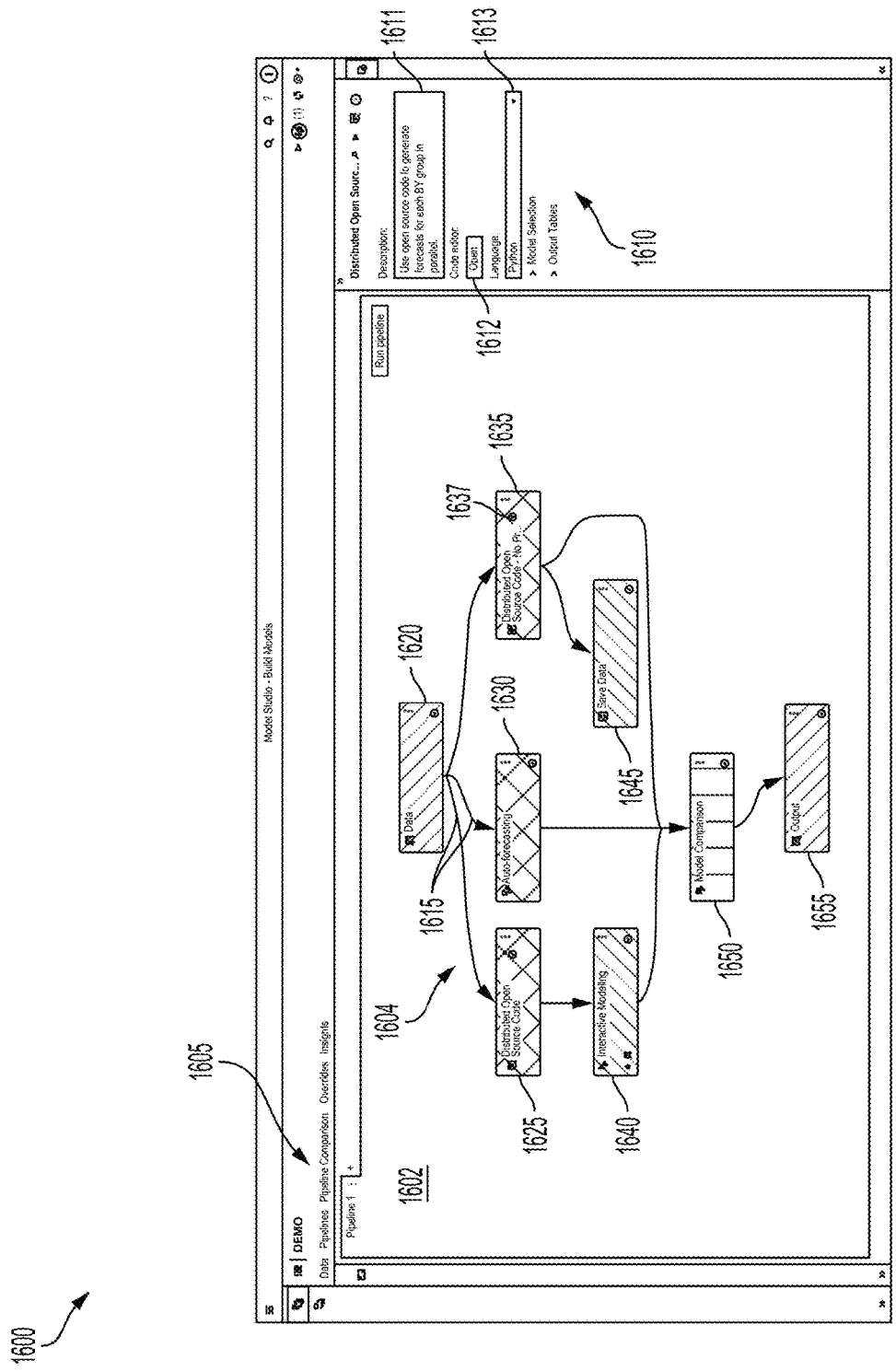
FIG. 16 shows an illustration of an example of a forecasting pipeline GUI including a drag-and-drop canvas, according to some aspects of the present disclosure.

Turning now to FIG. 16, FIG. 16 shows an illustration of an example of a forecasting pipeline GUI 1600 including a drag-and-drop canvas 1602, according to some aspects of the present disclosure. The forecasting pipeline GUI 1600 includes top controls 1605 and sidebar controls 1610. The top controls 1605 may include UI controls for switching between various functions of the GUI 1510, menus, configuration options, and so on. Several examples are depicted in FIG. 16. Likewise, the sidebar controls 1610 may include UI controls for configuring the forecasting pipeline 1604, selecting the external language, opening an editor for entering or editing custom code, and so on. For example, the sidebar controls 1610 may include a description text input control 1611 that can be used for entering a description of the drag-and-drop canvas 1602 or of an external-language execution node 1625, 1635. The sidebar controls 1610 may include a code editor toggle control 1612 that can be used for activating a code editor for generating or editing custom code, an example of which is shown below with respect to FIG. 17. The sidebar controls 1610 may include a language selector drop-down control 1613 that can be used to select or specify the external programming language associated with one or more external-language execution nodes 1625, 1635. For both top controls 1605 and sidebar controls 1610, the particular UI controls available in the forecasting pipeline GUI 1600 may vary between implementations.

Forecasting pipeline 1604 is depicted on a drag-and-drop canvas 1602, similar to the drag-and-drop canvas 1515 described above with respect to FIG. 15. The drag-and-drop canvas 1602 shows a number of example nodes that are part of the example forecasting pipeline 1604. The example nodes are connected using directed arrows 1615. The directed arrows 1615, in some examples, are representative of logical connections between the nodes. For example, the directed arrows 1615 may correspond to an ordering of node execution, the flow of data, dependencies among the nodes, and so on.

The vertical ordering of the nodes may correspond to the execution order of the respective nodes. For instance, the pipeline 1604 may be executed in a top-down sequence, with nodes that are higher up (e.g., node 1620) being executed before nodes that are lower down (e.g., node 1655) on the canvas 1602. The ordering of the nodes may be selectively changeable by the user to define and re-defined the pipeline 1604. For example, a set of rearrangeable nodes may have an initial arrangement on the drag-and-drop canvas 1602 corresponding to a first sequence of operations. A user may interact with the drag-and-drop canvas 1602 to move a node, such as the external-language execution node 1625, to another location that may be in the same vertical level or a different vertical level from its starting position. The directed arrows 1615 may be similarly adjusted automatically or manually as part of the rearrangement operation. The result of the rearrangement operation may be a second sequence of operations that is different from the first sequence of operations. The second sequence of operations can have a changed ordering with respect to one or more operations as compared to the first sequence of operations. This example is provided for illustrative purposes, but implementations of the drag-and-drop canvas 1602 may have a well-defined visual syntax that constrains the ordering of operations and changes thereto.

Various types of nodes may be provided by the forecasting pipeline GUI 1600. The drag-and-drop canvas 1602 enables users to create, edit, copy, delete, and otherwise manipulate the nodes of the forecasting pipeline 1604 to conform the forecasting pipeline 1604 to the desired sequence of forecasting and data analytics operations.

In this illustration, functional groupings of node types are indicated using shading. But in other examples, functional groupings can be indicated using colors or other UI indicators. For example, because nodes 1620 and 1655 have functions relating to data input or output, nodes 1620 and 1655 have similar shading and iconography, which may correspond to their shared functional grouping. More specifically, node 1620 is a data input node. Node 1620 can be interacted with using the controls provided by the forecasting pipeline GUI 1600 to, for example, configure the input time series data or select time series subsets using a suitable partitioning scheme. Node 1655 is a data output node. Node 1655 can be interacted with using the controls provided by the forecasting pipeline GUI 1600 to, for example, configure the output time series data. Nodes in the same functional grouping may have some controls or functions in common, but particular node types may have controls or functions that are distinct from other node types.

Directed arrows 1615 from node 1620 indicate logical connections to nodes 1625, 1630, and 1635. Nodes 1625, 1630, and 1635 have functions relating to forecasting. Node 1630 is an auto-forecasting node. An auto-forecasting node may be used for, for example, automatically selecting and applying an appropriate time series forecasting model (e.g., a statistical model or a machine learning model) to the input time series data to generate forecasts. The auto-forecasting node can provide an interface for selecting or configuring alternative forecasting operations to those performed using custom code. This can allow for comparison and selection of a champion forecasting model. For instance, the auto-forecasting node 1630 can be configured to choose one of, for example, an Autoregressive Integrated Moving Average (ARIMA) model, a Recurrent Neural network (RNN) model, or an exponential smoothing model (ESM) for the input time series data using a suitable automatic time series analysis and forecasting library, framework, module, or toolkit and suitable selection criteria.

Nodes 1625 and 1635 are external-language execution nodes. An external-language execution node may be used for associating or inserting custom code defined using an external programming language into the forecasting pipeline. For example, an external-language execution node can be used to generate custom code (e.g., using a suitable text editing program) or to identify existing custom code (e.g., selecting a file containing custom code). In some examples, the programming language used in an external-language execution node may be selected or indicated using a control such as the example control shown in the sidebar controls 1610. In some examples, the external programming language can be automatically detected using clues from syntax, file extensions, header or comment information, and so forth.

The external-language execution nodes 1625, 1635 may have other functions such as providing an interface for configuring shared variables, execution threads, and so on. In some examples, such as node 1635, the external-language execution node can be used to configure external storage of forecasting results, forecasting attributes, or input data, which may have been processed by the custom code input to the external-language execution node. In some examples, an indication 1637 of the outcome of a validation operation may be shown on node 1635 or other nodes. The indication may, for example, correspond to a failed validation operation. For instance, the external-language execution nodes 1635 may require the population of a particular shared variable upon completion of forecasting operations. If the node 1635 detects that the particular shared variable is not populated, indication 1637 may be shown. For instance, node 1635 is connected with node 1645 using a directed arrow 1615. Node 1645 may be used during post-processing to persist the forecasting result, forecasting attributes, or other information generated during forecasting operations.

The custom code associated with the external-language execution nodes 1625, 1635 can be used to define, for example, forecasting operations. Execution of the pipeline 1604 can cause custom code associated with the external-language execution nodes 1625, 1635 to receive input time series data and output forecasts, statistical confidence limits information about the forecasts, and other associated outputs. The custom code associated with the external-language execution nodes 1625, 1635 can be used for other operations. For example, the custom code can be used for data pre-processing, data hygiene, data transformation or formatting, and so on. In general, the capabilities of the custom code associated with the external-language execution nodes 1625, 1635 is commensurate with the capabilities of the external programming language in use.

Nodes 1640 and 1645 have functions relating to data processing. In addition to the data persistence function performed by node 1645, node 1640 is an interactive modeling node. The interactive modeling node 1640 may provide controls for fine-tuning and adjusting forecasts through manual intervention and exploration of model parameters and results, following the completion of the forecasting operations.

Node 1650 is a forecasting model comparison node and is the only example of a node from this functional grouping. The forecasting model comparison node can be used for evaluation and comparison of performance metrics output by different forecasting models, including those output by external-language execution nodes. In some examples, the forecasting model comparison node can be used for determining a champion forecasting operation based on comparisons made among various forecasting models. For example, the forecasting pipeline may include forecasting nodes that are configured to execute alternative forecasting operations, rather than the forecasting operation performed by the wrapped custom code. For instance, the forecasting software 1501 may provide a number of pre-built or pre-configured forecasting models that can be used in lieu of or along with the forecasting operations of the wrapped custom code.

It will be appreciated that the nodes and pipeline 1604 shown in FIG. 16 are for illustrative purposes and not intended to be limiting. Other examples may include more, fewer, or different nodes than are shown. Other examples may also include a different arrangement of nodes than is shown. Dozens or hundreds of nodes may be available for inclusion and arrangement in a given pipeline as desired by the user.

Figure 17:
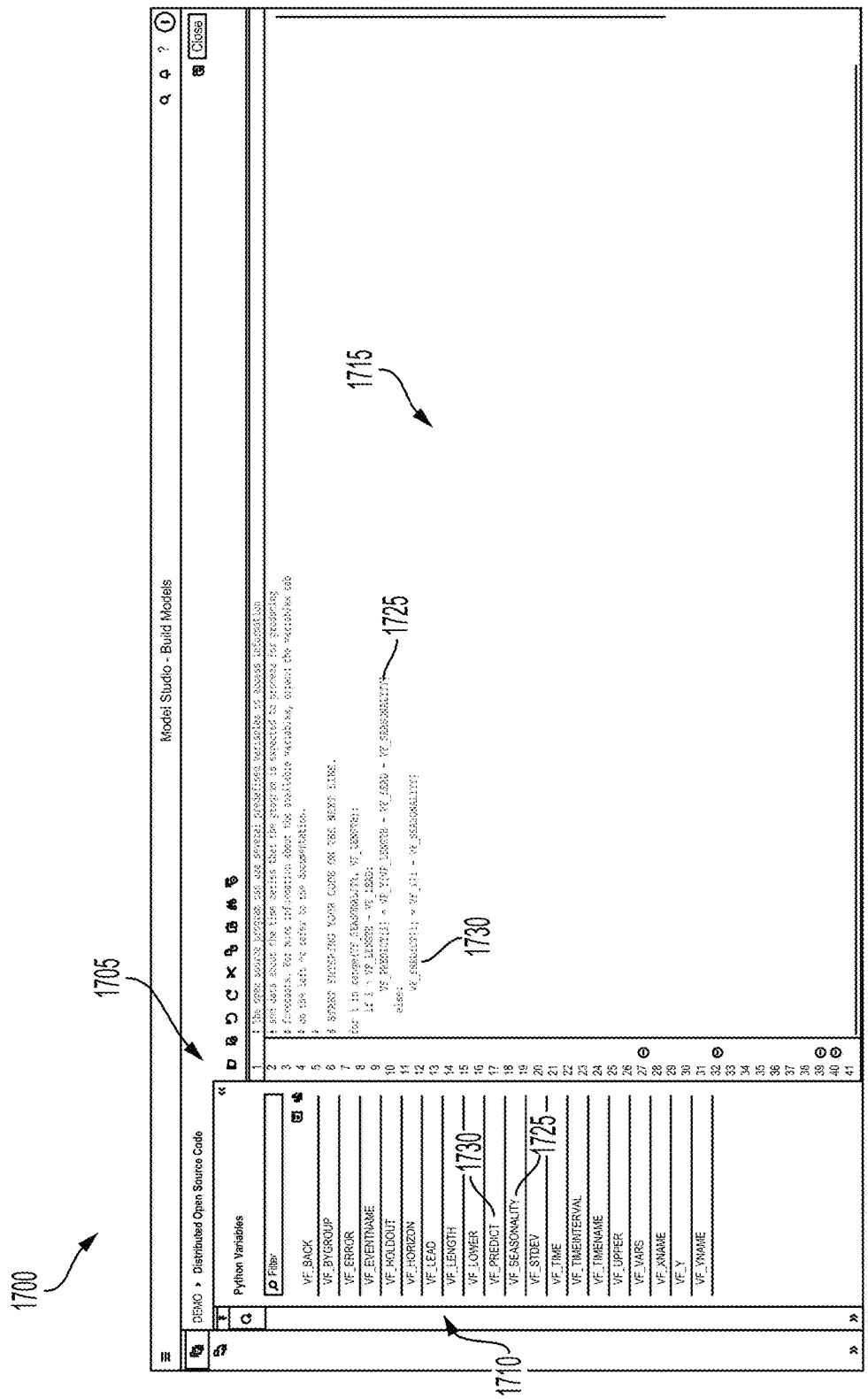
FIG. 17 shows an illustration of an example editor for custom code written in an external programming language for an external-language execution node as may be displayed in a GUI provided by forecasting software, according to some aspects of the present disclosure.

Turning now to FIG. 17, FIG. 17 shows an illustration of an example editor 1700 for custom code written in an external programming language for an external-language execution node as may be displayed in a GUI 1510 provided by forecasting software 1501, according to some aspects of the present disclosure. The editor 1700 includes top controls 1705. The top controls 1705 may include UI controls for switching between various functions of the GUI 1510, configuration options, buttons for editing functions (e.g., copy/paste, zoom, etc.), and so on. Several examples are depicted in FIG. 17. The particular UI controls included among top controls 1705 may vary between implementations.

Editor 1700 includes shared variables sidebar 1710. The shared variables sidebar 1710 includes a listing of and controls for configuring some or all of the shared variables identified by the forecasting software 1501. In some examples, the shared variables may be predefined, according to a specification of the forecasting software 1501. In other examples, the shared variables may be configurable by the user and identified using a suitable UI control. The shared variables can include input variables corresponding to the external programming language or output variables corresponding to the default programming language.

The shared variables may be "input-only" variables, in which case they can be specified or identified using the default programming language and a tool such as variables sidebar 1710. In this case, the input-only shared variables can be populated in the default programming language and the information thus populated can be accessed by the custom code written in the external programming language. In some examples, the shared variables may be configured as "two-way" variables in which case the shared variables can function both as an input variable and an output variable. For instance, the two-way shared variables may be populated in either of the default programming language or the external programming language. The variables sidebar 1710 may include a control for selecting the behavior of the shared variables (not shown).

The input variables include input information to be provided by the forecasting software 1501 to the custom code, whereas the output variables include output information to be provided from the custom code to the forecasting software 1501. In some examples, a shared variable can be both an input variable and an output variable.

The forecasting software 1501 can verify that the custom code in editor 1700 (or otherwise loaded) is properly formatted and configured for execution. In some examples, for instance, certain shared variables may be required to be referenced, assigned, or populated before the custom code can be executed. In one example, the shared variable "VF_PREDICT" represents the predicted values computed by the custom code (e.g., the forecast).

In some examples, the forecasting software 1501 can verify that the data types of the input and output shared variables are compatible. For example, the forecasting software 1501 can verify that the type of an input variable matches the information or metadata provided to the custom code about the input variable. Likewise, the forecasting software 1501 can verify that the type of an output variable matches information provided by the custom code about the output variable. For instance, the forecasting software 1501 can infer the type of a particular output variable from Python code.

The shared variables can correspond to various values used during the execution of forecasting operations. For example, the shared variables may correspond to properties of the input time series, properties of the forecasts being modeled, or configuration information about the forecasting software. In some examples, the shared variables may correspond to quantities or values such as arrays of forecasted values, error metrics, confidence limits, standard errors, or forecasting model metadata.

In some examples, the shared variables may include event variables. In the context of visual forecasting pipelines and custom code input to external-language execution nodes for execution, an event may refer to an incident that disrupts the normal flow of a process that generates the input time series. Event variables can be used to model the effect that such incidents have on the dependent time series. One or more shared variables may thus correspond to one or more events. The shared event variables may include information about independent variables in the input time series corresponding to predetermined events such as holidays, retail promotions, or natural disasters.

Editor 1700 includes an editor window 1715. In the illustration of FIG. 17, the editor window 1715 includes example custom code written in the Python programming language. Other programming languages may alternatively be used. The programming languages may be supported to varying degrees by special functions of the editor 1700 including syntax highlighting, debugging capabilities, artificial intelligence (AI) coding assistants, and so on. In the example custom code in editor window 1715, a particular variable 1725 is used as part of a statement. In this example used for illustrative purposes, the particular variable 1725, labeled "VF_SEASONALITY," can correspond to the length of the seasonal cycle as defined using configuration controls such as sidebar controls 1610. The same particular variable 1725 can be seen in the shared variables sidebar 1710. The particular variable 1725 in the shared variables sidebar 1710 can serve as a UI control for obtaining information about or configuring the particular variable 1725. For instance, in some examples, a data type associated with the particular variable 1725 can be viewed or changed using the controls provided in shared variables sidebar 1710. The shared variables sidebar 1710 includes the shared variable "VF_PREDICT" 1730 which represents the predicted values computed by the custom code (e.g., the forecast). In some examples, the shared variable "VF_PREDICT" 1730 is required to be populated for the custom code to execute.

Figure 18:
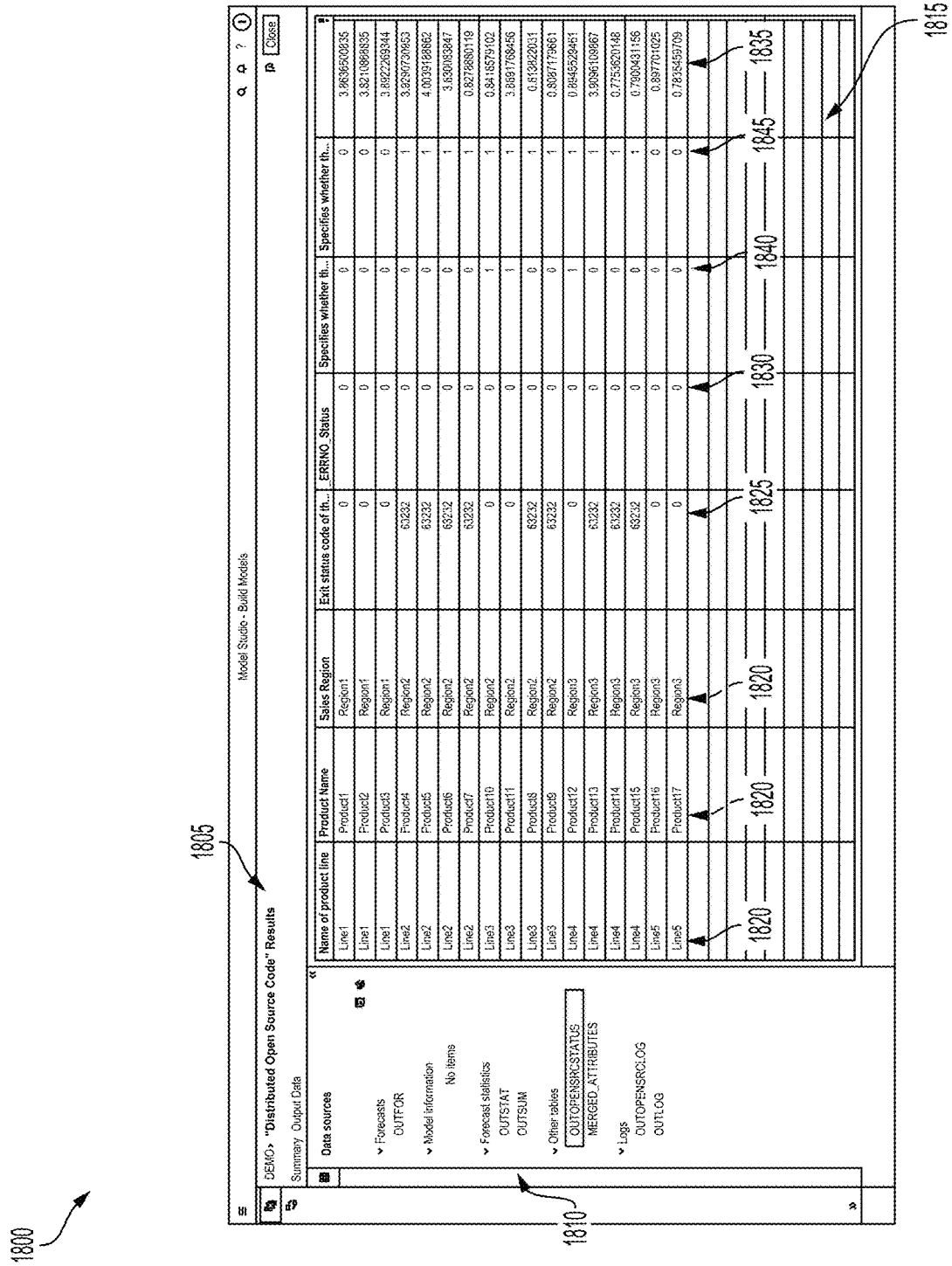
FIG. 18 shows an illustration of an example of a tabulated report generated upon execution of custom code associated with an external-language execution node as may be displayed on a GUI provided by forecasting software, according to some aspects of the present disclosure.

Turning now to FIG. 18, FIG. 18 shows an illustration of an example of a tabulated report 1800 generated upon execution of custom code associated with an external-language execution node as may be displayed on a GUI 1510 provided by forecasting software 1501, according to some aspects of the present disclosure. The tabulated report 1800 includes top controls 1805 and sidebar controls 1810. The top controls 1805 may include UI controls for switching between various functions of the GUI 1510, configuration options, buttons for customizing table views, spreadsheet functionality (e.g., filter or sort), and so on. Several examples are depicted in FIG. 18. The sidebar controls 1810 may include, for example UI controls for selecting various portions or subsets of the tabulated report 1800. The particular UI controls included among top controls 1805 and sidebar controls 1810 may vary between implementations.

The tabulated report 1800 includes a two-dimensional matrix of cells 1815. The cells 1815 can be populated with information generated by the forecasting software 1501 following execution of a node or the forecasting pipeline, including the custom code associated with one or more external-language execution nodes. The information in the cells 1815 can be organized in various ways according to the particular forecast.

For example, the input time series data may be partitioned in order to isolate the effects of certain dependent variables prior to the forecasting operation. In that case, the cells 1815 may be organized according to the time series partitions. For example, the input time series data may include one or more time series comprises a time identifying variable, one or more independent variables, and a number of dependent variables. The time identifying variable may be a quantity that defines the relative chronological ordering of the time series data entries, such as a timestamp or counter.

From the input time series data, one or more forecasts can be generated. Each forecast can include predictions of one or more target variables at a future time. To partition the input time series data, one or more grouping variables 1820 may be selected. Each set of one or more grouping variables 1820 can be used to define a time series subset that can be used to generate a forecast. Thus, a particular set of input time series data may result in a number of forecasts, depending on the grouping variables 1820 selected. One example of this partitioning technique is referred to a "BY-grouping." In BY-grouping, the input time series data is divided based on the values of one or more grouping variables, allowing for separate analysis or processing on each subset of the dataset. For example, in one implementation, the input time series data can be partitioned based on unique combinations of values in one or more selected grouping variables. In that case, each unique combination of values for the selected grouping variables results in a time series subset.

In some examples, forecasts can be generated for each of the time series subsets generated using the grouping variables 1820 to partition the time series input data. The forecasts for the subsets can be generated in parallel in some cases. In that case, the forecasting software 1501 can determine a set of available parallel execution threads. Then, the forecasting pipeline can be executed using each time series subset as the input time series data on an available execution thread. As part of the forecasting pipeline, the wrapped custom code can be executed on each respective execution thread. The resulting forecast can be provided by the execution threads. In this example, the resulting forecast will correspond to the subset of the time series data selected by the grouping variables 1820.

In cells 1815, the grouping variables 1820 are shown as the headers of the first three columns. Each row corresponds to a time series subset that is defined by the distinct triad of three grouping variables 1820. There may be zero, one, or many grouping variables 1820 according to the particular forecasting requirement.

Each row of cells 1815 also includes several other columns showing information generated by the forecasting software 1501 or executed wrapped custom code following the completion of forecasting operations. For example, the cells may include an exit status code column 1825. The exit status code column 1825 can show termination status of a process that executed wrapped custom code, such as Python script. The exit status code column 1825 may include values such as 0 which may indicate a successful completion without errors or non-zero values that may suggest an error or abnormal termination. In that case, the particular number shown may represent a custom or system-specific error code.

The cells 1815 may include a system error code column 1830. The system error code column 1830 can show system-level error codes defined by the hosting operating system that arise during program execution, particularly when system calls fail. For example, if the wrapped custom code is a Python script that fails to execute because a data file cannot be found, the script may terminate and the containing process may exit with a system error code of 2, which may correspond to an error thrown by the Python interpreter that can indicate a variety of implementation-dependent error conditions.

The cells 1815 may include a total run time column 1835 that shows the total run time of the forecasting operation performed using the wrapped custom code for the particular time series subset defined by the grouping variables 1820.

Additional columns may be included in cells 1815. For instance, column 1840 shows a Boolean output that indicates whether the custom code made invalid modifications, such as deleting, reshaping, or garbling a particular shared variable (e.g., a required shared variable such as the "VF_PREDICT" shared variable). Column 1845 shows a Boolean output that indicates whether one or more forecasts are missing for certain time periods. Various examples can show different columns, including different datatypes, showing information about the execution of custom code associated with an external-language execution node.

Figure 19:
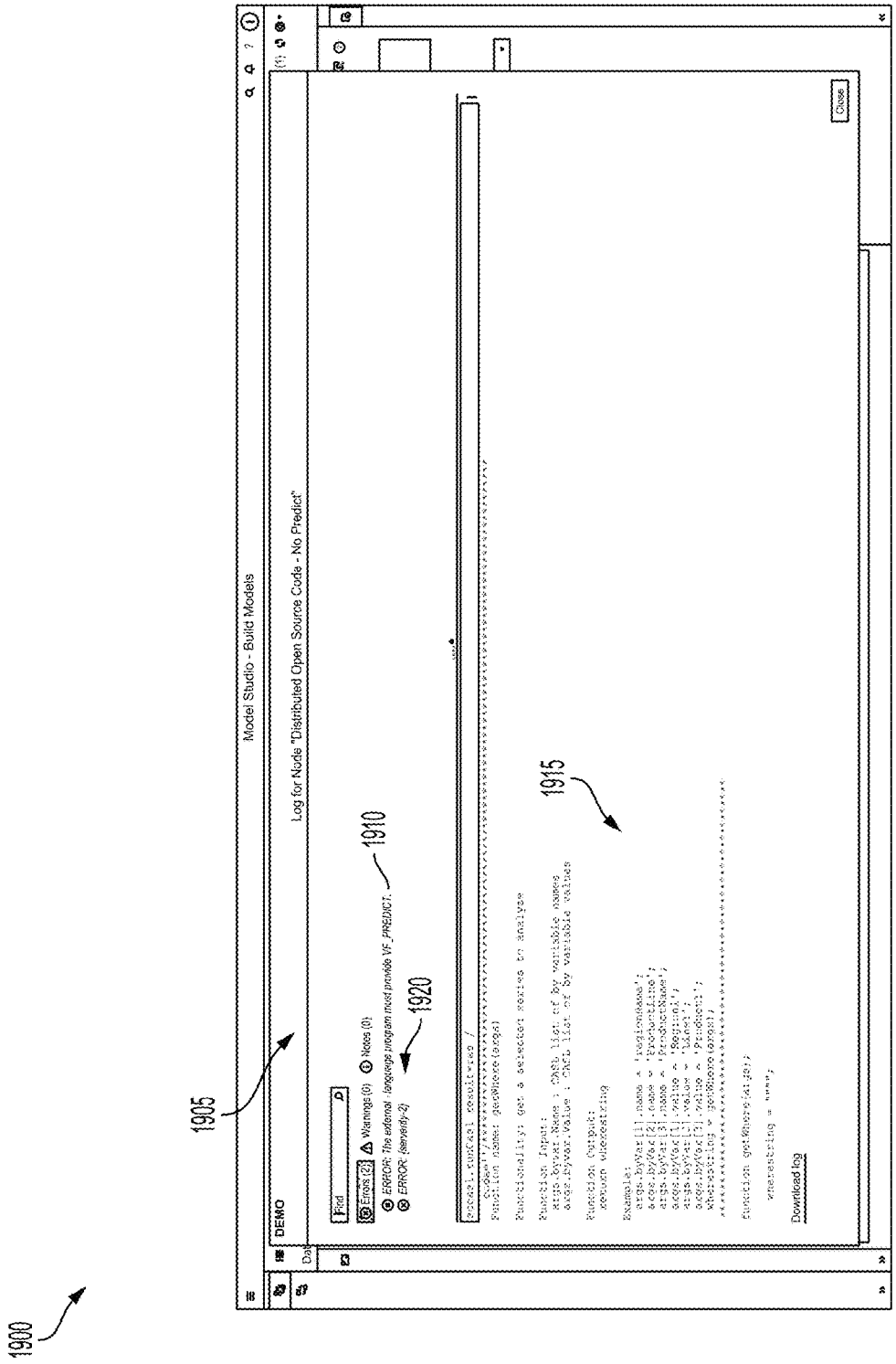
FIG. 19 shows an illustration of an example of an execution result generated upon executing an external-language execution node, according to some aspects of the present disclosure.

Turning now to FIG. 19, FIG. 19 shows an illustration of an example of an execution result 1900 generated upon executing an external-language execution node as may be displayed on a GUI 1510 provided by forecasting software 1501, according to some aspects of the present disclosure. For example, the execution result 1900 may be displayed by operating a suitable UI control associated with external-language execution node 1625 as shown in FIG. 16.

The execution result 1900 may include an execution result dialog 1905. The execution result dialog 1905 may include information about the execution result. In this example, the execution result 1900 depicts information about a forecasting operation associated with an external-language execution node, such as execution of wrapped custom code, that failed or halted. The execution result dialog 1905 can include an error message 1920. The error message 1920 may include descriptive information about the error and quantitative information about the error such as a measure of the severity of the error.

The error message 1920 can include specific information about program code that caused the error. For example, error message 1920 includes a reference to a shared variable 1910, labeled "VF_PREDICT." In this example, the forecasting software 1501 has performed a verification that the wrapped custom code does not include or assign "VF_PREDICT," which represents the predicted values computed by the wrapped custom code (e.g., the forecast). The execution result dialog 1905 may include additional context 1915 for the error message 1920. The additional context 1915 can provide, for example, information about the forecasting software 1501 operation that caused or detected the error condition. In the example of FIG. 19, the additional context 1915 refers to program code interpreted by the forecasting software 1501 that is used to call or execute the wrapped custom code associated with an external-language execution node.

Figure 20:
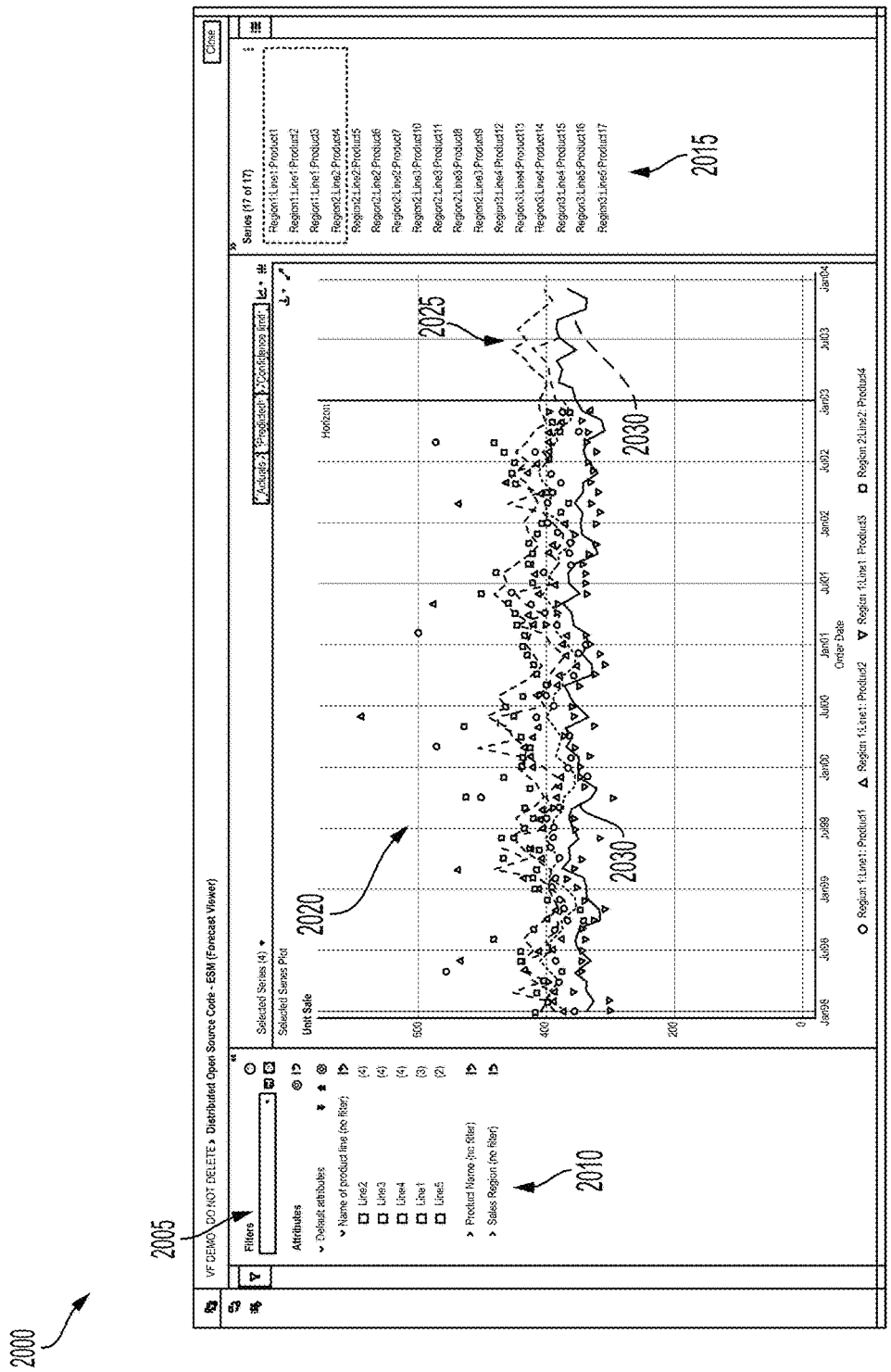
FIG. 20 shows an illustration of an example of a graphical forecast generated upon executing custom code associated with an external-language execution node as may be displayed on a GUI provided by forecasting software, according to some aspects of the present disclosure.

Turning now to FIG. 20, FIG. 20 shows an illustration of an example of a graphical forecast 2000 generated upon executing custom code associated with an external-language execution node as may be displayed on a GUI 1510 provided by forecasting software 1501, according to some aspects of the present disclosure. The graphical forecast 2000 includes top controls 2005 and sidebar controls 2010, 2015. The top controls 1805 may include UI controls for switching between various functions of the GUI 1510, configuration options, buttons for customizing chart views, and so on. Several examples are depicted in FIG. 20. The sidebar controls 2010, 2015 may include, for example, UI controls for selecting subsets of the displayed graphical data, labels, colors, scales, and so on. The particular UI controls included among top controls 2005 and sidebar controls 2010, 2015 may vary between implementations.

The example graphical forecast 2000 includes time series data 2020. The time series data 2020 represents the input time series data or a subset thereof that constitutes the historical values of the dependent or one or more target variables used to generate the forecasting model. For example, a forecasting model for forecasting price as a function of independent variables, such as season, weather, location, etc., may include values of the one or more target variables being predicted. In example graphical forecast 2000, these historical values are plotted as points along with forecasts 2030, which show the predicted values as determined by a forecasting model. The forecasts 2030 are shown along with confidence calculations 2025 associated with the forecasts. For example, the confidence calculations 2025 may represent a region of statistical uncertainty.

The graphical forecast 2000 can be used to show alternative forecasts generated by the forecasting software 1501 along with the forecasts generated by wrapped custom code associated with external-language execution nodes. These forecasts can be shown simultaneously in the graph for easy comparison of their accuracy and consistency.

In some examples the forecasting pipeline can include a forecasting node that is configured to provide an interface for executing a forecasting operation provided by the forecasting software 1501. The forecasting software 1501 can receive forecasts output from both the output of the forecasting node and the wrapped custom code associated with an external-language execution nodes, which may be executing in parallel on separate execution threads. The forecasting software 1501 can determine and compare the accuracies of the received forecasts to determining a "champion" forecasting operation based on the comparison. The champion forecasting operation may then be used for forecasting in a production setting.

Figure 21A:
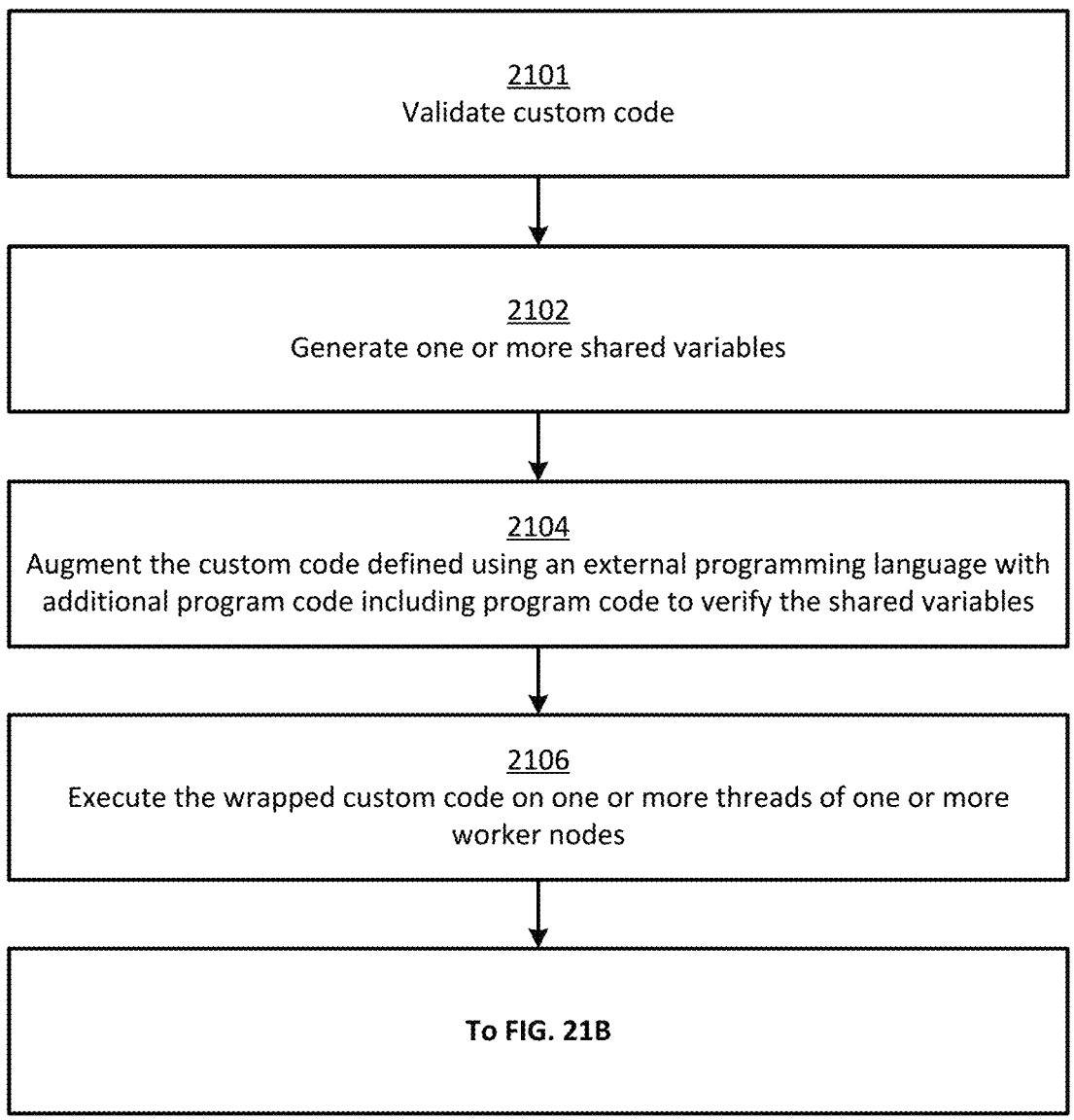
FIGS. 21A-21B shows a flowchart of an example of a process for executing custom code associated with an external-language execution node as part of a visual forecasting pipeline, according to some aspects of the present disclosure.
Figure 21B:
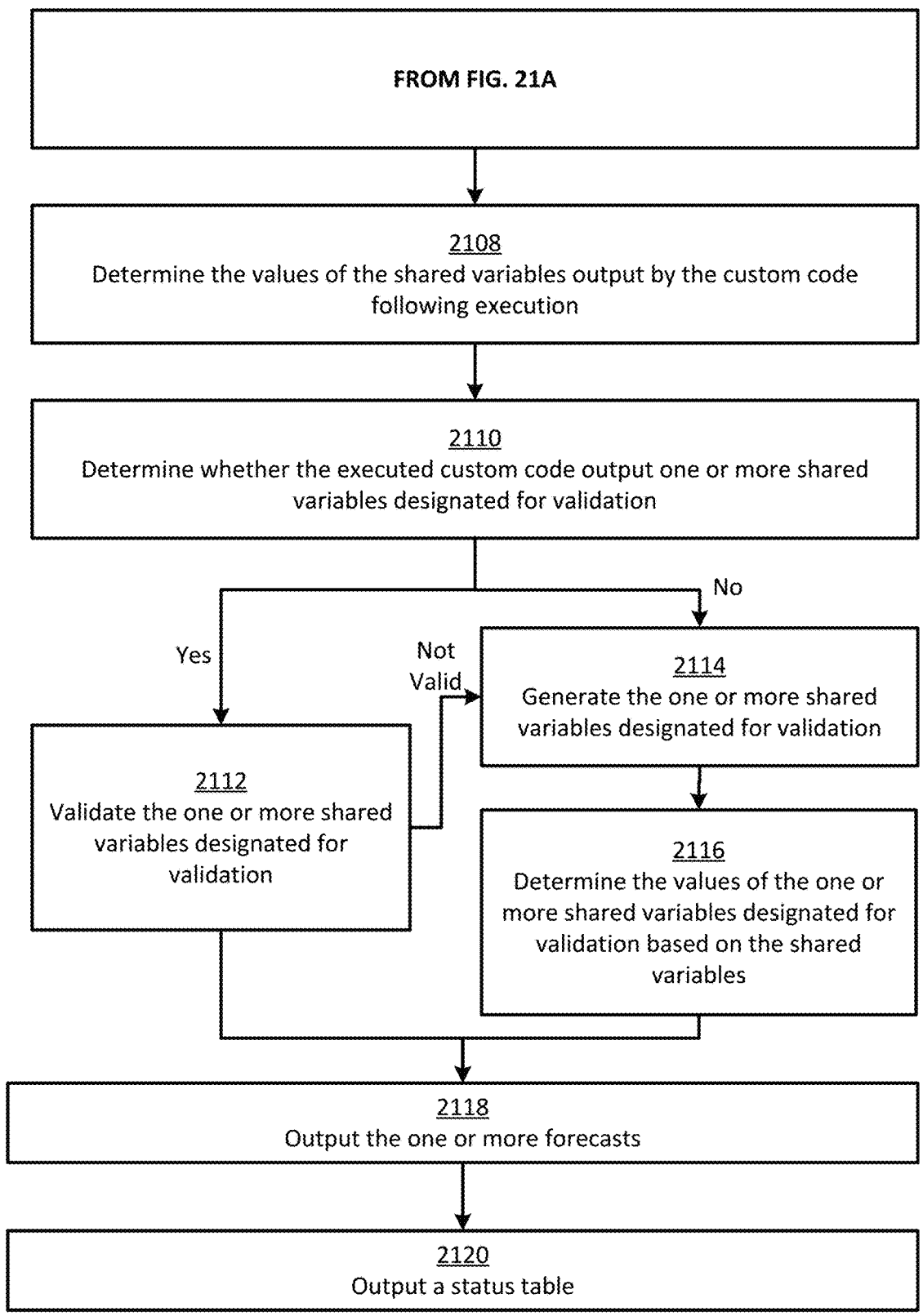

FIGS. 21A-21B show a flowchart of an example of a process for executing custom code associated with an external-language execution node as part of a visual forecasting pipeline, according to some aspects of the present disclosure. Other examples may involve more operations, fewer operations, different operations, or a different order of operations than is shown in FIGS. 21A-21B.

In block 2101, a computer system validates custom code. For example, consider an example of custom code including a forecasting model written in the R programming language. Prior to the augmentation of the custom code as described below in block 2104, a number of validation operations can be performed to ensure that execution of the custom code is configured properly for execution in an external-language execution node as part of the visual forecasting pipeline.

In some examples, the validation operations may involve parsing the custom code to verify that a predefined input contract is met. The custom code can be parsed using regular expressions, static analysis tools, abstract syntax tree (AST) parsers, type checkers, or a combination of these or similar tools. The input contract can include a number of verifications (e.g., Boolean expressions) alone or in conjunction with APIs of the parsing tools to validate various aspects of the custom code. For instance, the input contract may include a requirement that the custom code include certain shared variables. In one example, the input contract may require the presence of a "VF_PREDICT" variable that can represent the result of the forecasting operation performed by the custom code.

In block 2102, the computer system generates one or more shared variables. The shared variables may include one or more event variables. The event variables can correspond to predetermined events that are represented by one or more independent variables in one or more time series. The event variables can be incorporated into forecast models to model the effect that certain corresponding predetermined events have on the dependent time series. For instance, the shared event variables may include information that corresponds to predetermined events, such as election days, major sports finals, tax filing deadlines, school summer breaks, daylight saving time, and so on. In some examples, the event variables may include information that corresponds to the abnormal deviations (e.g., outliers) observed in one or more dependent variables.

Generation of the one or more shared variables can involve a series of serial or parallel operations according to the particular execution. For instance, a particular external programming language or set of configuration settings (e.g., the settings of sidebar controls 1610) may result in a particular set of operations. In one example, generation of the one or more shared variables may include initializing variables corresponding to node settings. For example, sidebar controls 1610 may include a parameter corresponding to the number of data points in each input time series to retain for a holdout sample (e.g., a portion of the input time series reserved to the forecasting model's performance). In this context, initialization of variables may include instantiating, declaring, or assignment of variables both within either or both of the default programming language of the forecasting software or the wrapped custom code.

The generation of the one or more shared variables may include initializing variables corresponding to project-level settings. Project-level settings can refer to configurations that apply to the entire forecasting project such as configurations defined or set during the generation of the forecasting pipeline GUI 1600.

The generation of the one or more shared variables can include initialization of numerical arrays to share the values of the independent variables and the dependent variables between the forecasting software and the executing wrapped custom code. The numerical arrays can also be used for one or more shared event variables. The numerical arrays can further be used to share the time values for the input time series, sometimes referred to as the "time ID variables." For example, the time ID variables may be the times and/or dates corresponding to each value of the input independent and dependent variables. The numerical arrays may also include placeholders for forecasting outputs, confidence computations, calculated errors, statistical computations, and so on.

The generation of the one or more shared variables may include initialization of one or more character or string variables corresponding to the names of the shared variables such as the names of the time ID variables, the dependent variables, the independent variables, the event variables, or the grouping variables. These character or string variables can be used to determine a correspondence between the variables of the default programming language and the external programming language when the variable names differ for certain shared variables.

In block 2104, the computer system augments custom code defined using an external programming language with additional program code including program code to verify the shared variables. For example, consider an example of custom code including a forecasting model written in the R programming language. The custom code may be augmented by appending a header and/or footer to the custom code. The appended code may be in the R programming language as well.

In some examples, some or all of the additional, augmenting program code can be in a programming language other than the external programming language. For example, the custom code may be wrapped using the default programming language interpreted by the forecasting software 1501. In some examples, the custom code may be wrapped using a programming language that is interpreted by the forecasting software 1501 and that is different from the default programming language.

In some examples, augmentation of the custom code can involve program code that validates and maps variables from the default programming language to the external programming language, effectively acting as a bridge between the default programming language, and thereby the forecasting software, and the external programming language. For example, the augmentation of the custom code may include ensuring that data shared using shared variables having integer types (or other numerical types) is accurately conveyed from the default programming language to the external programming language or from the external programming language back to the default programming language.

Augmentation of the custom code may include creation of character or string variables or arrays to include information about shared variable names, including event variables. Augmentation of the custom code may include creation of named access to values of time series variables. For example, a dictionary, hashmap, or other associative array datatype can be used to associate the names of time series variables in the default programming language with corresponding names in the external programming language. Augmentation of the custom code may include creation of variables or arrays to hold the names of grouping variables (sometimes referred to as "BY" variables) based on the names of shared variables previously identified such as by using the associative array just created. Once again, the variables or arrays to hold the names of grouping variables may be an associative array datatype.

In block 2106, the computer system executes the wrapped custom code on one or more threads of one or more computing nodes. For instance, input time series data can be partitioned using one or more grouping variables to generate a number of time series subsets. Since forecasting modeling can be performed on multiple input time series in parallel, execution of the wrapped custom code on separate, distributed threads is a suitable optimization.

The forecasting software 1501 may have, in some examples, a number of communicatively coupled computing nodes available, each of which has a number of available threads. The available threads may, in some implementations, be abstracted into a single thread pool. For instance, a cloud computing environment may provide a service for execution of tasks on any number of computing nodes whose details are hidden from the forecasting software 1501. The forecasting software 1501 can cause the execution of the wrapped custom code given an input time series subset on an ephemeral process created for execution of the wrapped custom code on a designated or requested thread. An example process showing execution of the wrapped custom code on one or more threads of one or more computing nodes is described below in FIG. 22.

In block 2108, the computer system determines the values of the shared variables output by the wrapped custom code following execution. For example, one shared variable may be labeled "VF_PREDICT." This shared output variable can be populated with predicted values computed by the executed wrapped custom code (e.g., a forecast). Other examples of shared variables may include shared variables with names such as "VF_ERROR," "VF_STD," "VF_LOWER," and "VF_UPPER." These shared variables may be used to characterize one or more confidence computations associated with the forecast output by the wrapped custom code. The confidence computations may include, for example, a prediction error, a prediction standard error, and lower and upper confidence limits, respectively.

In block 2110, the computer system determines whether the executed wrapped custom code output one or more shared variables designated for validation. For example, the one or more shared variables designated for validation may include shared variables such as prediction confidence limits, prediction standard error, or prediction error. If the variables are included, in block 2112, the computer system validates the one or more shared variables designated for validation. For example, the forecasting software can determine, following execution, that the appropriate shared variables are populated with the expected number and type of values.

If the variables are not included in the output from the wrapped custom code, in block 2114, the computer system generates the one or more shared variables designated for validation. For example, the computer system can generate the shared variables for prediction confidence limits, prediction standard error, or prediction error. Then, in block 2116, the computer system determines the values of the one or more shared variables designated for validation based on the shared variables. For example, the computing system can compute the values for prediction confidence limits, prediction standard error, or prediction error. The computing system can compute such missing values based on the forecasts generated by the pipeline and other information output by the pipeline (e.g., output by the wrapped custom code), and assign them to the shared variables generated in block 2114.

For example, the computer system can receive an output forecast of the wrapped custom code from an execution thread. Based on the output shared variables from the wrapped custom code, the forecasting software 1501 can determine whether or not the output excludes a particular confidence calculation. If so, the forecasting software can execute one or more confidence computations associated with the output forecast, in lieu of using the wrapped custom code to perform the confidence computations.

In some examples, the forecasting software 1501 can determine that the wrapped custom code computes a value for a particular shared variable by analyzing the wrapped custom code. For example, the external-language code execution engine 1530 may include a component that can perform static analysis on the wrapped custom code and detect the presence of certain shared variables, validate their type, or validate the syntax of the program code used to populate those variables. Then, based on the determination that the wrapped custom code lacks a computation for a particular shared variable, the forecasting software 1501 can execute one or more operations to supply a value for that shared variable, in lieu of using the wrapped custom code to supply the value.

Regardless of whether the variables are determined to be included or not in the wrapped custom code, in block 2118, the computer system outputs the one or more forecasts. The one or more forecasts may include shared variable data, such as the computed confidence computations. For instance, a shared variable such as the "VF_PREDICT" variable may include an array of predicted values determined by the wrapped custom code.

In some examples, the one or more forecasts can be used for the generation of visualizations. For example, the one or more forecasts generated by the pipeline can be used to generate visualizations of each forecast. Examples of such visualizations include the charted time series and forecasts shown in FIG. 20 above. Other example visualizations include scatter plots, heat maps, box plots, and so on.

At block 2120, the computer system outputs a status table, such as the example tabulated report 1800 shown above in FIG. 18. The status table can include information about the one or more forecasts, such as details of the input time series data or subsets thereof, information about the forecasts and forecast models, including the selected champion model, and so forth.

The status table can likewise include information about error conditions identified during the execution of the forecasting pipeline. For example, the forecasting software 1501 can receive an output of the wrapped custom code from an execution thread of the set of execution threads. The output can include an indication of an error condition associated with the execution of the wrapped custom code. For instance, execution of the wrapped custom code may result in the wrapped custom code terminating with a particular error code or with the process exiting with a particular system error code, such as the values in columns 1825 and 1830, respectively, as shown in FIG. 18. The reports can thus include information about the error conditions.

Figure 22:
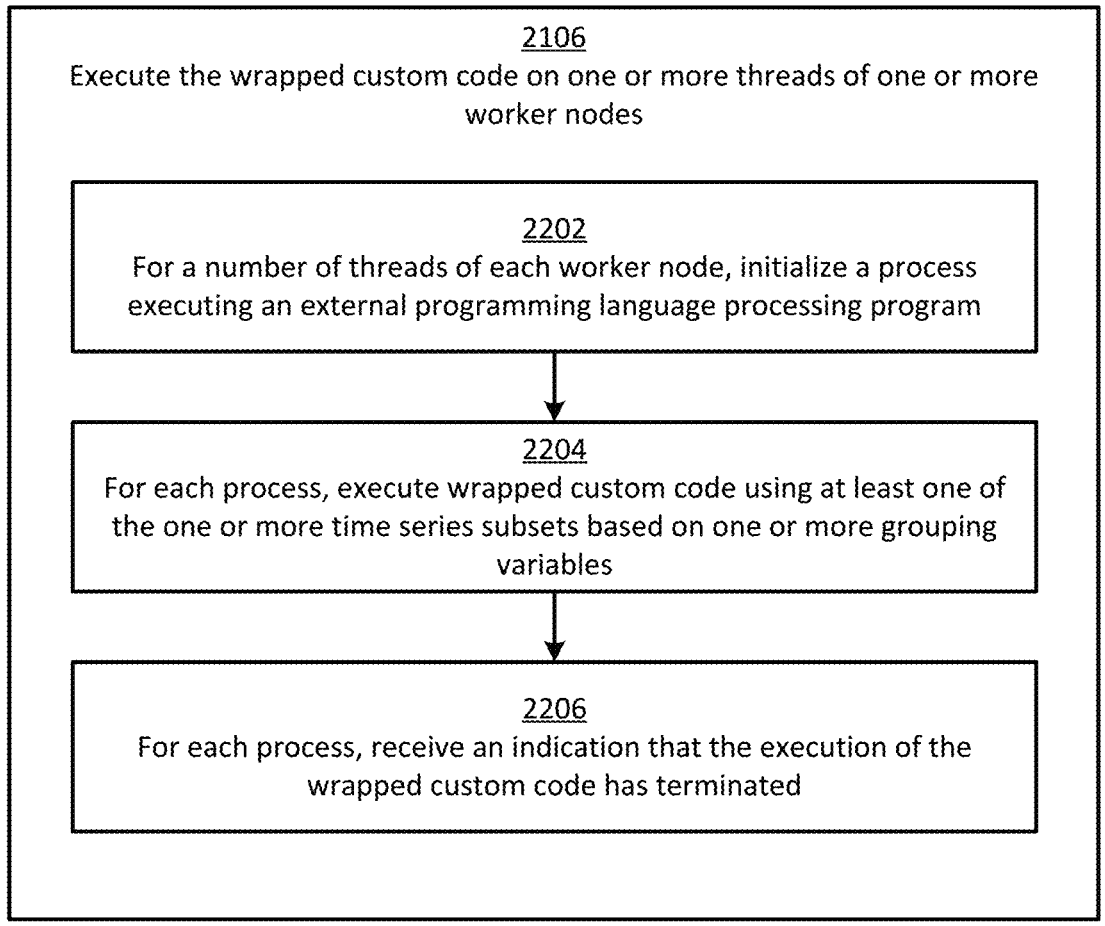
FIG. 22 shows a flowchart of another example of a process for executing custom code associated with an external-language execution node as part of a visual forecasting pipeline, according to some aspects of the present disclosure.

Turning now to FIG. 22, FIG. 22 shows a flowchart of another example of a process for executing custom code associated with an external-language execution node as part of a visual forecasting pipeline, according to some aspects of the present disclosure. Other examples may involve more operations, fewer operations, different operations, or a different order of operations than is shown in FIG. 22. In particular, the process shown in FIG. 22 shows additional detail relating to execution of the wrapped custom code on one or more threads of one or more worker nodes.

FIG. 22 is described in the context of a computing system having a number of worker nodes. For example, the computing system could be a cluster of servers configured with one or more coordinator nodes and one or more worker nodes, in which each worker node handles part of a distributed task. Alternatively, the computing system may be a cloud-based compute environment including virtualized or abstracted nodes including a coordinator node and one or more provisioned worker nodes. An example system showing a number of worker nodes in an example computing environment is shown below in FIG. 24.

At block 2202, for a number of threads of each worker node, the computing system initializes a process executing an external programming language processing program. For example, the worker nodes may include or be implemented in a virtualized environment by CPUs with multiple cores, in which each core can run one or more threads. Thus, each worker node may have a number of available threads that can be associated with processes, jobs, tasks, etc. using an API, such as a thread pool API or other suitable thread scheduling mechanism.

A number of processes can be initialized based on the number of parallel custom code executions based on the workload partitions identified by the forecasting software. For example, the wrapped custom code may, for example, execute forecasting models over a number of subsets of the input time series identified using, for example, grouping variables (e.g., "BY grouping"). Each forecasting operation implemented by the wrapped custom code may be executable independently and thus can be executed on a standalone execution thread given the partition a number of subsets of the input time series. Process initialization may include identification or selection of threads, initialization of the threads, "forking" a new process from the main process of the forecasting software, starting a new process on a remote computing system, or other operations according to the particular details of the computing system.

At block 2204, for each process, the computing system executes the wrapped custom code using at least one of the one or more time series subsets based on one or more grouping variables. Each process initialized as in block 2202 can be given a reference or otherwise be assigned the execution of the forecasting operation using the wrapped custom code and subset of the input data using, for example, the process of FIGS. 21A-21B.

At block 2206, for each process, the computing system receives an indication that the execution of the wrapped custom code has terminated. For example, following completion of the execution of the wrapped custom code, the wrapped custom code may output an error or status code indicating the presence of an error condition or other status information. The containing process or thread may likewise output an error or status code associated with the termination of the process or thread. Upon receipt of the error or status codes, the computing system may destroy or garbage collect the process and make the terminated thread available for execution of the wrapped custom code using another subset of the input time series or other operation.

Figure 23:
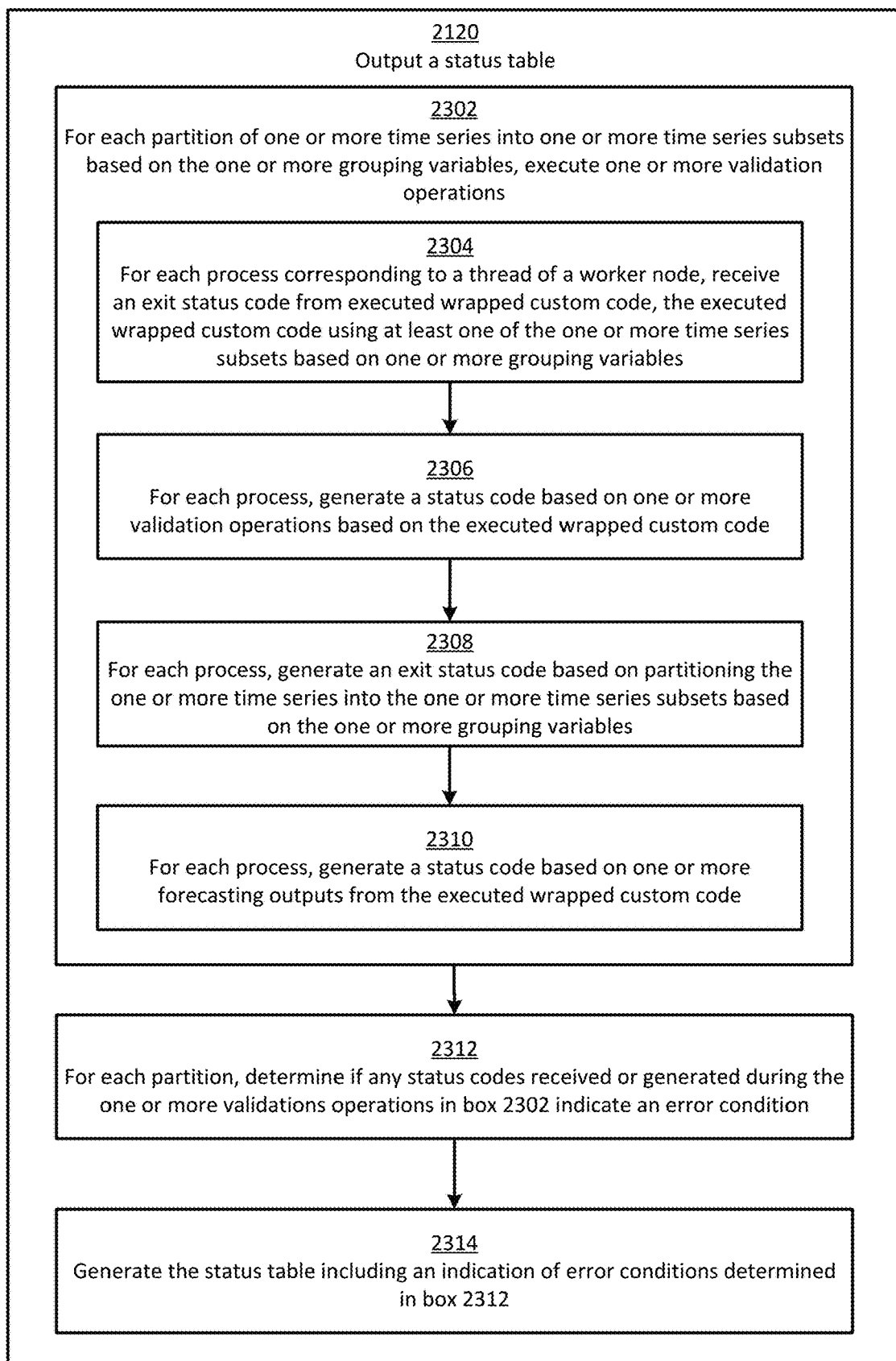
FIG. 23 shows yet another flowchart of an example of a process for executing custom code associated with an external-language execution node as part of a visual forecasting pipeline, according to some aspects of the present disclosure.

Turning now to FIG. 23, FIG. 23 shows yet another flowchart of an example of a process for executing custom code associated with an external-language execution node as part of a visual forecasting pipeline, according to some aspects of the present disclosure. Other examples may involve more operations, fewer operations, different operations, or a different order of operations than is shown in FIG. 23.

FIG. 23 shows additional detail for block 2120 of FIGS. 21A-21B above, relating to outputting of a status table following the completion of some or all forecasting operations. Block 2120, as shown in FIG. 23, includes block 2302. In block 2302, a computer system executes one or more validation operations for each partition of the time series generated based on the one or more grouping variables, similar to the example process described above in block 2106.

The validation operations include sub-block 2304. In sub-block 2304, the computer system receives an exit status code from the executed wrapped custom code for each process corresponding to a thread of a worker node, in which the executed wrapped custom code executed using as input at least one of the one or more time series subsets based on one or more grouping variables. For example, the wrapped custom code, written at least in part in the external programming language, may output an exit status code upon termination or completion. For instance, the containing process may be provided by an operating system, which provides a runtime context for the executing wrapped custom code. Upon completion of the execution, the wrapped custom code outputs a status code to the containing process. The status code may default to an error status code in the event the executed wrapped custom code does not output one. The process itself may output an operating system status code independently or related to the exit status code of the wrapped custom code.

In sub-block 2306, the computer system receives an exit status code based on partitioning the one or more time series into the one or more time series subsets based on the one or more grouping variables (e.g., "BY grouping"). For example, while executing the partition process described above in block 2106, an error may occur if a process has terminated abnormally due to various conditions, such as being out-of-memory or encountering an uncaught exception. In these cases, the partitioning process may output a status code that can be reported in the status report as generated in this example process.

In sub-block 2308, the computer system, for each executed process, generates a status code based on one or more validation operations based on the executed wrapped custom code. For example, the validation operations can determine whether the wrapped custom code made invalid modifications to shared variables. Invalid modifications may include deletion of data, reshaping of data structures, or adding invalid data to shared variables (e.g., garbling of shared variables). In some examples, these validation operations may be applied to certain shared variables such as the "VF_PREDICT" shared variable that includes the output of the forecasting operation.

In sub-block 2310, the computer system, for each process, generates a status code based on one or more forecasting outputs from the executed wrapped custom code. For example, if the forecasting operation completes successfully, a particular status code may be output. In another example, if the forecasting operation fails to complete or experiences an error condition, apart from errors associated with the wrapped custom code, then a different particular status code may be output. For instance, the forecasting operation, for a particular time series subset in a particular process, may fail due to a mathematical requirement. For example, the forecasting operation may result in a "divide by 0" operation that causes the forecasting operation to fail. In this event, a status code may be output in accordance with the nature of the failure. In yet another example, the status code may correspond to whether none, some, or all forecasting operations completed successfully. For instance, the status code may indicate that forecasts are missing for all time periods in the horizon forecast.

At block 2312, the computer system determines, for each partition, if any status codes received or generated during the one or more validations operations in block 2302 indicate an error condition. Error conditions may include process or wrapped custom code error status codes, error status codes associated with the partitioning by grouping variable, error status codes associated with validation operations of the executed wrapped custom code, error status codes associated with the completed forecasting operation, as well as other sources of error status codes.

At block 2314, the computer system generates the status table including an indication of error conditions determined in block 2310. An example status table is shown and described in detail in FIG. 18. Examples of the error status codes collected in block 2310 are depicted in FIG. 18 as exit status code column 1825, system error code column 1830, column 1840, and column 1845. Various examples of formats for the generated status table can be used including charts, graphs, tables, spreadsheets, CSV files, and so on.

Figure 24:
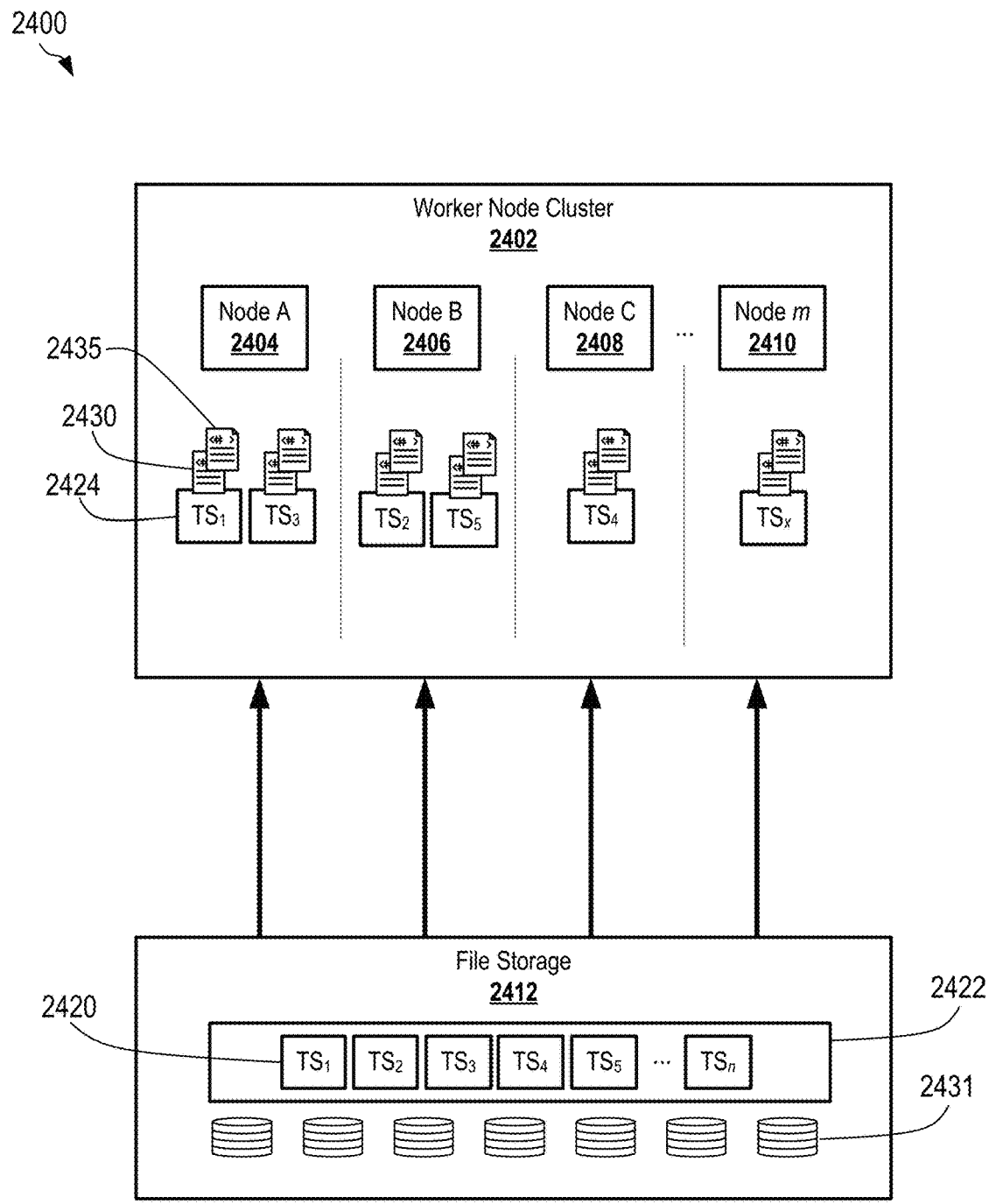
FIG. 24 shows a schematic diagram depicting wrapped custom code executing in parallel in a computing environment, according to some aspects of the present disclosure.

Turning now to FIG. 24, FIG. 24 shows a schematic diagram depicting wrapped custom code executing in parallel in a computing environment, according to some aspects of the present disclosure. The computing environment 2400 can include a worker node cluster 2402 and a file storage 2412. The computing environment 2400 can be used to perform, for example, block 1412 of process 1400 shown in FIG. 14.

The file storage 2412 can be a distributed file system or other suitable storage system for storing time series data 2420. The file storage 2412 can comprise a set of storage devices 2431 upon which the time series data 2420 is stored. The time series data 2420 can include data entries (e.g., records) stored in any suitable fashion.

In some cases, entries are stored in one or more tables, such as a table 2422. Table 2422 in FIG. 24 is depicted schematically as containing a set of time series 2420 to illustrate the inherent content of the table 2422, however it is noted that the actual data entries as stored in the table 2422 may not be stored in any sorted or grouped (e.g., by time series) format. As depicted for illustrative purposes, table 2422 contains n number of time series 2420 (e.g., time series $TS_1$ through time series $TS_n$). In some cases, a table 2422 may contain zero, one, or a plurality of time series 2420.

The worker node cluster 2402 is responsible for reading, distributing, and processing the time series data 2420. The worker node cluster 2402 can include any number of nodes (e.g., computing devices), although it may generally include a plurality of nodes. As depicted in FIG. 24, the worker node cluster 2402 contains m nodes ranging from Node A 2404, Node B 2406, and Node C 2408 up through Node m 2410.

As seen in FIG. 24, one or more time series 2424 or portion or subset thereof is distributed to each of the nodes 2404, 2406, 2408, 2410. Each time series 2424 is distributed along with custom code 2430 which is wrapped using additional program code 2435. Although additional program code 2435 is shown atop the custom code 2430 in this illustration, the additional program code 2435 wrapping custom code 2430 may be included as a header, footer, both a header and footer, code added to the body of custom code 2430, or any suitable combination thereof.

The one or more time series 2424 along with the custom code 2430 wrapped with additional program code 2435 can be executed by the respective worker node 2404 using one or more threads (not shown), each thread corresponding to a respective process. Upon completion of the execution, the custom code 2430 wrapped with additional program code 2435 or the associated process may output a status or error code and return the thread to the worker node 2404 for additional executions or operations.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors to perform operations including:
generating a graphical user interface (GUI) for forecasting software, wherein the GUI includes a drag-and-drop canvas comprising a set of rearrangeable nodes defining a forecasting pipeline for forecasting one or more time series, the forecasting pipeline involving a sequence of operations for processing the one or more time series to produce one or more forecasts, each rearrangeable node in the set of rearrangeable nodes corresponding to a respective operation of the sequence of operations;
detecting a user interaction with the GUI for attaching a rearrangeable node that is an external-language execution node to the set of rearrangeable nodes on the drag-and-drop canvas in relation to the forecasting pipeline, the external-language execution node being usable to insert custom code defined using an external programming language into the forecasting pipeline, wherein the external programming language is different than a first default programming language of the forecasting software, and wherein the custom code is code provided by a user of the GUI from a source external to the forecasting software;
receiving the custom code written in the external programming language for the external-language execution node;
receiving a user input for initiating an execution of the forecasting pipeline;
in response to receiving the user input, generating wrapped custom code by appending additional program code to the custom code, the additional program code enabling execution of the custom code written in the external programming language by a set of execution threads in an execution context of the first default programming language of the forecasting software, and the additional program code enabling sharing of data between the custom code and the forecasting software, wherein the additional program code includes one or more shared variables that can be mutually accessed in the external programming language and the first default programming language, the one or more shared variables including one or more input variables corresponding to the external programming language and one or more output variables corresponding to the first default programming language, wherein the one or more input variables include input information to be provided by the forecasting software to the custom code, and wherein the one or more output variables include output information to be provided from the custom code to the forecasting software;

providing the wrapped custom code to the set of execution threads, the set of execution threads being configured to execute the wrapped custom code as part of the forecasting pipeline to generate the one or more forecasts; and outputting the one or more forecasts in the GUI.

2. The system of claim 1, wherein:

the set of rearrangeable nodes has a first arrangement on the drag-and-drop canvas corresponding to a first sequence of operations; and the program code is further executable by the one or more processors to cause the processors to:

detect a second user interaction with the GUI for moving the external-language execution node to define a second arrangement on the drag-and-drop canvas, wherein the second arrangement defines a changed ordering with respect to at least two operations of the sequence of operations, the second arrangement on the drag-and-drop canvas corresponding to a second sequence of operations for the forecasting pipeline, the second sequence of operations being different from the first sequence of operations.

3. The system of claim 1, wherein:

each time series of the one or more time series comprises a time identifying variable, one or more independent variables, and a plurality of dependent variables;

each forecast of the one or more forecasts comprises one or more target variables at a future time; and the operations further include:

determining a set of available parallel execution threads;

partitioning the one or more time series into one or more time series subsets based on one or more grouping variables;

for each time series subset of the one or more time series subsets, executing the forecasting pipeline on an available execution thread using the time series subset, wherein executing the forecasting pipeline using the time series subset involves executing the wrapped custom code on the available execution thread; and receiving the one or more forecasts from the wrapped custom code on each available execution thread.

4. The system of claim 1, wherein the one or more shared variables correspond to:

one or more first properties of the one or more time series;

one or more second properties of the one or more forecasts; and configuration information about the forecasting software.

5. The system of claim 4, wherein the one or more shared variables comprise event variables corresponding to one or more events, the event variables including:

information about one or more independent variables in the one or more time series corresponding to one or more predetermined events; and information about one or more dependent variables in the one or more time series corresponding to one or more outlier values.

6. The system of claim 1, wherein the operations further comprise receiving an output of the wrapped custom code, the output including at least one forecast of the one or more forecasts.

7. The system of claim 6, wherein the output further includes one or more confidence computations associated with the at least one forecast of the one or more forecasts.

8. The system of claim 1, wherein the operations further comprise:

determining that the custom code excludes a confidence calculation by analyzing the custom code; and based on determining that the custom code excludes the confidence calculation, executing one or more confidence computations associated with at least one forecast of the one or more forecasts.

9. The system of claim 1, wherein the operations further include:

receiving an output of the wrapped custom code from an execution thread of the set of execution threads, the output comprising at least one forecast of the one or more forecasts;

determining that the output excludes a confidence calculation; and based on determining that the output excludes the confidence calculation, executing one or more confidence computations associated with the at least one forecast of the one or more forecasts.

10. The system of claim 1, wherein the operations further include:

receiving an output of the wrapped custom code from an execution thread of the set of execution threads, the output comprising an indication of an error condition associated with the execution of the wrapped custom code; and outputting information about the error condition in the GUI.

11. The system of claim 1, wherein outputting the one or more forecasts in the GUI comprises generating a report, the report comprising:

third information about the one or more forecasts; and fourth information about error conditions identified during the execution of the forecasting pipeline.

12. The system of claim 1, wherein outputting the one or more forecasts in the GUI comprises generating visualizations of each forecast of the one or more forecasts.

13. The system of claim 1, wherein the custom code defines a forecasting operation to be executed in the forecasting pipeline.

14. The system of claim 13, wherein the forecasting pipeline further comprises a rearrangeable node that is a forecasting node that is configured to execute an alternative forecasting operation, and wherein the operations further include:
  receiving a first output of the wrapped custom code from an execution thread of the set of execution threads, the first output comprising a first forecast;
  determining a first accuracy of the first forecast;
  receiving, from the forecasting node, a second output of the forecasting node, the second output comprising a second forecast;
  determining a second accuracy of the second forecast;
  generating a comparison by comparing the first accuracy with the second accuracy; and
    determining a champion forecasting operation based on the comparison.

15. The system of claim 1, wherein the custom code is received from an application programming interface (API) service endpoint, the API service endpoint being configured to receive an identification of the external-language execution node and the custom code.

16. The system of claim 1, wherein the additional program code includes first program code written in the external programming language and second program code written in a second default programming language of the forecasting software.

17. The system of claim 1, wherein the additional program code comprises includes a header appended to the beginning of the custom code and a footer appended to the end of the custom code.

18. The system of claim 1, wherein the operations further include:
  verifying that a type of at least one input variable matches the corresponding input information provided by the forecasting software; and
  verifying that a type of at least one output variable matches the corresponding output information provided by the custom code.

19. The system of claim 1, wherein the additional program code comprises first program code written in the external programming language that is appended to the custom code, and wherein the additional program code includes second program code written in the first default programming language, wherein the second program code enables the sharing of data between the custom code and the forecasting software.

20. A method comprising:
  generating a graphical user interface (GUI) for forecasting software, wherein the GUI includes a drag-and-drop canvas comprising a set of rearrangeable nodes defining a forecasting pipeline for forecasting one or more time series, the forecasting pipeline involving a sequence of operations for processing the one or more time series to produce one or more forecasts, each rearrangeable node in the set of rearrangeable nodes corresponding to a respective operation of the sequence of operations;
  detecting a user interaction with the GUI for attaching a rearrangeable node that is an external-language execution node to the set of rearrangeable nodes on the drag-and-drop canvas in relation to the forecasting pipeline, the external-language execution node being usable to insert custom code defined using an external programming language into the forecasting pipeline, wherein the external programming language is different than a first default programming language of the forecasting software, and wherein the custom code is code provided by a user of the GUI from a source external to the forecasting software;
  receiving the custom code written in the external programming language for the external-language execution node;
  receiving a user input for initiating an execution of the forecasting pipeline;
  in response to receiving the user input, generating wrapped custom code by appending additional program code to the custom code, the additional program code enabling execution of the custom code written in the external programming language by a set of execution threads in an execution context of the first default programming language of the forecasting software, and the additional program code enabling sharing of data between the custom code and the forecasting software, wherein the additional program code includes one or more shared variables that can be mutually accessed in the external programming language and the first default programming language, the one or more shared variables including one or more input variables corresponding to the external programming language and one or more output variables corresponding to the first default programming language, wherein the one or more input variables include input information to be provided by the forecasting software to the custom code, and wherein the one or more output variables include output information to be provided from the custom code to the forecasting software;
  providing the wrapped custom code to the set of execution threads, the set of execution threads being configured to execute the wrapped custom code as part of the forecasting pipeline to generate the one or more forecasts; and
  outputting the one or more forecasts in the GUI.

21. The method of claim 20, wherein:
  each time series of the one or more time series comprises a time identifying variable, one or more independent variables, and a plurality of dependent variables;
  each forecast of the one or more forecasts comprises one or more target variables at a future time; and
  the operations further include:
    determining a set of available parallel execution threads;
    partitioning the one or more time series into one or more time series subsets based on one or more grouping variables;
    for each time series subset of the one or more time series subsets, executing the forecasting pipeline on an available execution thread using the time series subset, wherein executing the forecasting pipeline using the time series subset involves executing the wrapped custom code on the available execution thread; and
  receiving the one or more forecasts from the wrapped custom code on each available execution thread.

22. The method of claim 20, wherein the operations further comprise receiving an output of the wrapped custom code, the output including:
  at least one forecast of the one or more forecasts; and
  one or more confidence computations associated with at least one forecast of the one or more forecasts, wherein the confidence computations include one or more confidence limits and a standard error.

23. The method of claim 20, wherein the custom code defines a forecasting operation to be executed in the forecasting pipeline.

24. The method of claim 20, wherein the forecasting pipeline further comprises a rearrangeable node that is a forecasting node that is configured to execute an alternative forecasting operation, and wherein the operations further include:
receiving a first output of the wrapped custom code from an execution thread of the set of execution threads, the first output comprising a first forecast;
determining a first accuracy of the first forecast;
receiving, from the forecasting node, a second output of the forecasting node, the second output comprising a second forecast;
determining a second accuracy of the second forecast;
generating a comparison by comparing the first accuracy with the second accuracy; and
determining a champion forecasting operation based on the comparison.

25. The method of claim 20, wherein the additional program code includes first program code written in the external programming language and second program code written in a second default programming language of the forecasting software.

26. A non-transitory computer-readable medium comprising program code that is executable by one or more processors for causing the one or more processors to:
generate a graphical user interface (GUI) for forecasting software, wherein the GUI includes a drag-and-drop canvas comprising a set of rearrangeable nodes defining a forecasting pipeline for forecasting one or more time series, the forecasting pipeline involving a sequence of operations for processing the one or more time series to produce one or more forecasts, each rearrangeable node in the set of rearrangeable nodes corresponding to a respective operation of the sequence of operations;
detect a user interaction with the GUI for attaching a rearrangeable node that is an external-language execution node to the set of rearrangeable nodes on the drag-and-drop canvas in relation to the forecasting pipeline, the external-language execution node being usable to insert custom code defined using an external programming language into the forecasting pipeline, wherein the external programming language is different than a first default programming language of the forecasting software, and wherein the custom code is code provided by a user of the GUI from a source external to the forecasting software;
receive the custom code written in the external programming language for the external-language execution node;
receive a user input for initiating an execution of the forecasting pipeline;
in response to receiving the user input, generate wrapped custom code by appending additional program code to the custom code, the additional program code enabling execution of the custom code written in the external programming language by a set of execution threads in an execution context of the first default programming language of the forecasting software, and the additional program code enabling sharing of data between the custom code and the forecasting software, wherein the additional program code includes one or more shared variables that can be mutually accessed in the external programming language and the first default programming language, the one or more shared variables including one or more input variables corresponding to the external programming language and one or more output variables corresponding to the first default programming language, wherein the one or more input variables include input information to be provided by the forecasting software to the custom code, and wherein the one or more output variables include output information to be provided from the custom code to the forecasting software;
provide the wrapped custom code to the set of execution threads, the set of execution threads being configured to execute the wrapped custom code as part of the forecasting pipeline to generate the one or more forecasts; and
output the one or more forecasts in the GUI.

27. The non-transitory computer-readable medium of claim 26, wherein:
each time series of the one or more time series comprises a time identifying variable, one or more independent variables, and a plurality of dependent variables;
each forecast of the one or more forecasts comprises one or more target variables at a future time; and
the operations further include:
determining a set of available parallel execution threads;
partitioning the one or more time series into one or more time series subsets based on one or more grouping variables;
for each time series subset of the one or more time series subsets, executing the forecasting pipeline on an available execution thread using the time series subset, wherein executing the forecasting pipeline using the time series subset involves executing the wrapped custom code on the available execution thread; and
receiving the one or more forecasts from the wrapped custom code on each available execution thread.

28. The non-transitory computer-readable medium of claim 26, wherein the operations further comprise receiving an output of the wrapped custom code, the output including:
at least one forecast of the one or more forecasts; and
one or more confidence computations associated with the at least one forecast of the one or more forecasts, wherein the confidence computations include one or more confidence limits and a standard error.

29. The non-transitory computer-readable medium of claim 26, wherein the forecasting pipeline further comprises a rearrangeable node that is a forecasting node that is configured to execute an alternative forecasting operation, and wherein the operations further include:
receiving a first output of the wrapped custom code from an execution thread of the set of execution threads, the first output comprising a first forecast;
determining a first accuracy of the first forecast;
receiving, from the forecasting node, a second output of the forecasting node, the second output comprising a second forecast;
determining a second accuracy of the second forecast;
generating a comparison by comparing the first accuracy with the second accuracy; and
determining a champion forecasting operation based on the comparison.

30. The non-transitory computer-readable medium of claim 26, wherein the additional program code includes first program code written in the external programming language and second program code written in a second default programming language of the forecasting software.

* * * * *